US012663198B2

(12) United States Patent
Schoeppner et al.

(10) Patent No.: US 12,663,198 B2
(45) Date of Patent: Jun. 23, 2026

(54) DEFROST FAN CONTROL

(71) Applicant: Trane Technologies Life Sciences LLC, Davidson, NC (US)

(72) Inventors: Thomas A. Schoeppner, Marietta, OH (US); Alex Roberts, Parkersburg, WV (US); Trace A. Lydick, Athens, OH (US); Mitchell J. Donnelly, Williamstown, WV (US)

(73) Assignee: Trane Technologies Life Sciences LLC, Davidson, NC (US)

( * ) Notice: Subject to any disclaimer, the term of this patent is extended or adjusted under 35 U.S.C. 154(b) by 180 days.

(21) Appl. No.: 18/585,642

(22) Filed: Feb. 23, 2024

(65) Prior Publication Data

US 2025/0271199 A1 Aug. 28, 2025

(51) Int. Cl.

*B01L 7/00* (2006.01)
*F25D 17/06* (2006.01)
*F25D 21/00* (2006.01)

(52) U.S. Cl.

CPC .............. *F25D 21/006* (2013.01); *B01L 7/50* (2013.01); *F25D 17/06* (2013.01); *B01L 2300/1894* (2013.01)

(58) Field of Classification Search

CPC .......... F25D 2317/068; F25B 2600/112; F25B 47/02; F25B 7/00
See application file for complete search history.

(56) References Cited

U.S. PATENT DOCUMENTS 5,553,997 A 9/1996 Goshaw et al.
5,797,729 A 8/1998 Rafuse, Jr. et al.
5,921,092 A 7/1999 Behr et al.
6,058,723 A * 5/2000 Kusunoki .............. F25D 29/00 62/155
6,324,856 B1 12/2001 Weng
6,557,358 B2 5/2003 Weng et al.
6,574,978 B2 6/2003 Flynn et al.
6,766,652 B2 7/2004 Kelly et al.
8,011,191 B2 9/2011 Wang et al.
(Continued)

FOREIGN PATENT DOCUMENTS

EP 0227504 B1 9/1989
EP 1443289 A1 8/2004
(Continued)

OTHER PUBLICATIONS

Merkushev, "Status notification led—Home Assistant," Mar. 2, 2022, 21 pages, https://brushknight.medium.com/status-notification-led-home-assistant-2eb800506ce2.
(Continued)

*Primary Examiner* — Ana M Vazquez
(74) *Attorney, Agent, or Firm* — Womble Bond Dickinson (US) LLP

(57) ABSTRACT

A refrigeration module of a cold space chamber has a blower and an evaporator. A method of controlling the refrigeration module includes defrosting a coil of the evaporator to form a volume of warm air surrounding the coil. The method includes circulating a refrigerant through the evaporator after defrosting the coil, to cool the coil. The method includes operating the blower in a series of pulses to control introduction of the volume of warm air into the cold space chamber.

18 Claims, 16 Drawing Sheets

(56) References Cited

U.S. PATENT DOCUMENTS

| | | | | |
|---|---|---|---|---|
| 8,020,389 | B2 | 9/2011 | Ascani | |
| 8,448,459 | B2 | 5/2013 | McSweeney et al. | |
| 8,590,327 | B2 | 11/2013 | Tobe et al. | |
| 8,826,677 | B2 | 9/2014 | Clodic et al. | |
| 9,021,823 | B2 | 5/2015 | Caillat | |
| 9,239,174 | B2 | 1/2016 | Rockenfeller et al. | |
| 9,429,347 | B2 | 8/2016 | Sugimoto et al. | |
| 9,476,625 | B2 | 10/2016 | McSweeney | |
| 9,494,354 | B2 | 11/2016 | McSweeney et al. | |
| 9,541,907 | B2 | 1/2017 | McSweeney | |
| 9,593,869 | B2 | 3/2017 | Asari et al. | |
| 9,597,970 | B2 | 3/2017 | DeBoer, III et al. | |
| 9,646,468 | B2 | 5/2017 | Smith et al. | |
| 9,683,563 | B2 | 6/2017 | Caillat | |
| 9,835,360 | B2 | 12/2017 | Wang et al. | |
| 9,989,280 | B2 | 6/2018 | Ali | |
| 10,072,876 | B2 | 9/2018 | Wang et al. | |
| 10,254,016 | B2 | 4/2019 | Sata et al. | |
| 10,760,825 | B2 | 9/2020 | Tamaoki et al. | |
| 10,816,243 | B2 | 10/2020 | Wang et al. | |
| 10,838,454 | B2 | 11/2020 | Salmon et al. | |
| 10,845,097 | B2 | 11/2020 | Wang et al. | |
| 10,962,009 | B2 | 3/2021 | Pham et al. | |
| 11,137,185 | B2 * | 10/2021 | Farrar | F25B 40/06 |
| 11,215,384 | B2 | 1/2022 | Bartlett et al. | |
| 11,566,820 | B2 | 1/2023 | Yamawaki et al. | |
| 11,927,380 | B2 | 3/2024 | Kawano et al. | |
| 2004/0139763 | A1 | 7/2004 | Jeong et al. | |
| 2007/0271936 | A1 | 11/2007 | Wakamoto et al. | |
| 2009/0058246 | A1 | 3/2009 | Cittadini et al. | |
| 2009/0205344 | A1 | 8/2009 | Ascani | |
| 2009/0235678 | A1 | 9/2009 | Taras et al. | |
| 2011/0072836 | A1 | 3/2011 | Wang et al. | |
| 2011/0138826 | A1 | 6/2011 | Lifson et al. | |
| 2012/0204581 | A1 | 8/2012 | Kang et al. | |
| 2015/0176866 | A1 | 6/2015 | Takayama et al. | |
| 2017/0343276 | A1 | 11/2017 | Cheon | |
| 2018/0106523 | A1 | 4/2018 | Besore et al. | |
| 2018/0347863 | A1 | 12/2018 | Tamaoki et al. | |
| 2019/0242623 | A1 | 8/2019 | Chhajed | |
| 2022/0079823 | A1 | 3/2022 | Nahavandi et al. | |
| 2022/0087446 | A1 | 3/2022 | Friend et al. | |
| 2022/0366520 | A1 | 11/2022 | Sudman et al. | |

FOREIGN PATENT DOCUMENTS

| | | | |
|---|---|---|---|
| EP | 1674806 | A1 | 6/2006 |
| EP | 1783445 | A1 | 5/2007 |
| EP | 1869379 | B1 | 1/2010 |
| EP | 2995885 | B1 | 4/2020 |
| EP | 2522933 | B1 | 9/2020 |
| GB | 2442241 | A | 4/2008 |
| JP | 2008008593 | A | 1/2008 |
| WO | 2006/013762 | A1 | 2/2006 |

OTHER PUBLICATIONS

A1 Medical Integration, "Over Door / Patient Status Light—White," 2023, 2 pages, https://a1props.com/product/over-door-patient-status-light-white/.

Elo Touch Solutions, Inc., "Status Light (Gen 1)," 2024, 5 pages, Elo® Official Website, https://www.elotouch.com/accessories-status-light-gen-1.html.

Emerson: "E2 Installation and Operation Manual for RX Refrigeration, BX HVAC, and CX Convenience Store 1 Controllers", Apr. 6, 2010 (Apr. 6, 2010), pp. 1-252, XP093291321, Retrieved from the Internet: URL:https://statichtpg.globalimageserver.com/_WP/img/docs/imos/coldzone/E2_User_Manual.pdf.

* cited by examiner

DEFROST FAN CONTROL

CROSS-REFERENCE TO RELATED APPLICATIONS

This application is related to U.S. application Ser. No. 18/585,852, entitled "Cold Storage Systems," naming Trace A. Lydick, Alex Roberts, Thomas A. Schoeppner, Benjamin T. Irwin, Mitchell J. Donnelly, and Luke Schlicher as inventors, and naming Technologies Life Sciences LLC as the and Applicant), U.S. Application Ser. No. 18/585,725, entitled "COMPRESSOR CONTROL PROCESS FOR VARIABLE CASCADE REFRIGERATION SYSTEM," naming Thomas A. Schoeppner, Alex Roberts, and Trace A. Lydick as inventors, and naming Technologies Life Sciences LLC as the Applicant). Each of these applications is being filed on the same day as the instant application, and the entire contents of each of these applications is hereby incorporated by reference.

TECHNICAL FIELD

The present disclosure generally relates to cold storage systems that are configured to maintain a desired temperature in a cold space chamber. More specifically, the present disclosure relates to systems and methods for fan control in such a cold storage system following a defrost operation.

BACKGROUND

Cold storage systems, such as refrigerators, freezers, and the like may be used to store goods or other materials at temperatures that are lower than ambient conditions. For life-science products and materials, such as vaccines, biological samples, or other related materials, it is paramount that a cold storage system maintain desired environmental parameters (such as temperature, relative humidity, etc.) to avoid degradation or spoiling.

Cold storage systems may achieve temperatures within an inner storage chamber thereof that are notably lower than the surrounding ambient environment. For instance, some low temperature cold storage systems may be designed to achieve and maintain so-called "ultra-low" temperatures. As a result, careful design of the features and assemblies of such a cold storage system is called for to ensure optimal performance and operating efficiency at such low temperatures.

Cold storage systems, particularly those maintaining temperatures below the freezing point of water, may experience frost accumulation from ambient air entering a cold space chamber (e.g., when a door of the cold space chamber is opened). Defrosting (or "defrost operations") helps to address frost accumulation; however, defrost operations may not be optimal, or may introduce problems, in some cold storage systems. Thus, there is an ongoing need for technological improvements in the systems and methods relating to defrosting in cold storage systems.

SUMMARY

The present disclosure includes, without limitation, the following examples.

One embodiment is a method of controlling a refrigeration module of a cold space chamber. The refrigeration module has a blower and an evaporator. The method includes defrosting a coil of the evaporator to form a volume of warm air surrounding the coil. The method includes circulating a refrigerant through the evaporator after defrosting the coil, to cool the coil. The method includes operating the blower in a series of pulses to control introduction of the volume of warm air into the cold space chamber.

One embodiment is a cold storage system. The cold storage system includes a housing defining a cold space chamber therein. The cold storage system includes a refrigeration module configured to cool the cold space chamber. The refrigeration module includes an evaporator and a blower configured to generate an airflow from the evaporator to the cold space chamber. The cold storage system includes a controller, communicatively coupled to the refrigeration module. The controller is configured to defrost a coil of the evaporator to form a volume of warm air surrounding the coil. The controller is configured to circulate a refrigerant through the evaporator, to cool the coil. The controller is configured to activate the blower in a series of pulses to control introduction of the volume of warm air into the cold space chamber.

One embodiment is a tangible, non-transitory, computer-readable media. The media has instructions thereupon which, when executed by a processor, cause the processor to perform a method. The method includes defrosting a coil of an evaporator to form a volume of warm air surrounding the coil. The method includes circulating a refrigerant through the evaporator to cool the coil. The method includes operating a blower in a series of pulses to control introduction of the volume of warm air to a cold space chamber.

These and other features, aspects, and advantages of the disclosure will be apparent from a reading of the following detailed description together with the accompanying drawings, which are briefly described below. The disclosure includes any combination of two, three, four, or more of the above-noted embodiments, examples, or implementations as well as combinations of any two, three, four, or more features or elements set forth in this disclosure, regardless of whether such features or elements are expressly combined in a specific example description herein. This disclosure is intended to be read holistically such that any separable features or elements of the disclosed disclosure, in any of its various aspects, embodiments, examples, or implementations, should be viewed as intended to be combinable unless the context clearly dictates otherwise.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
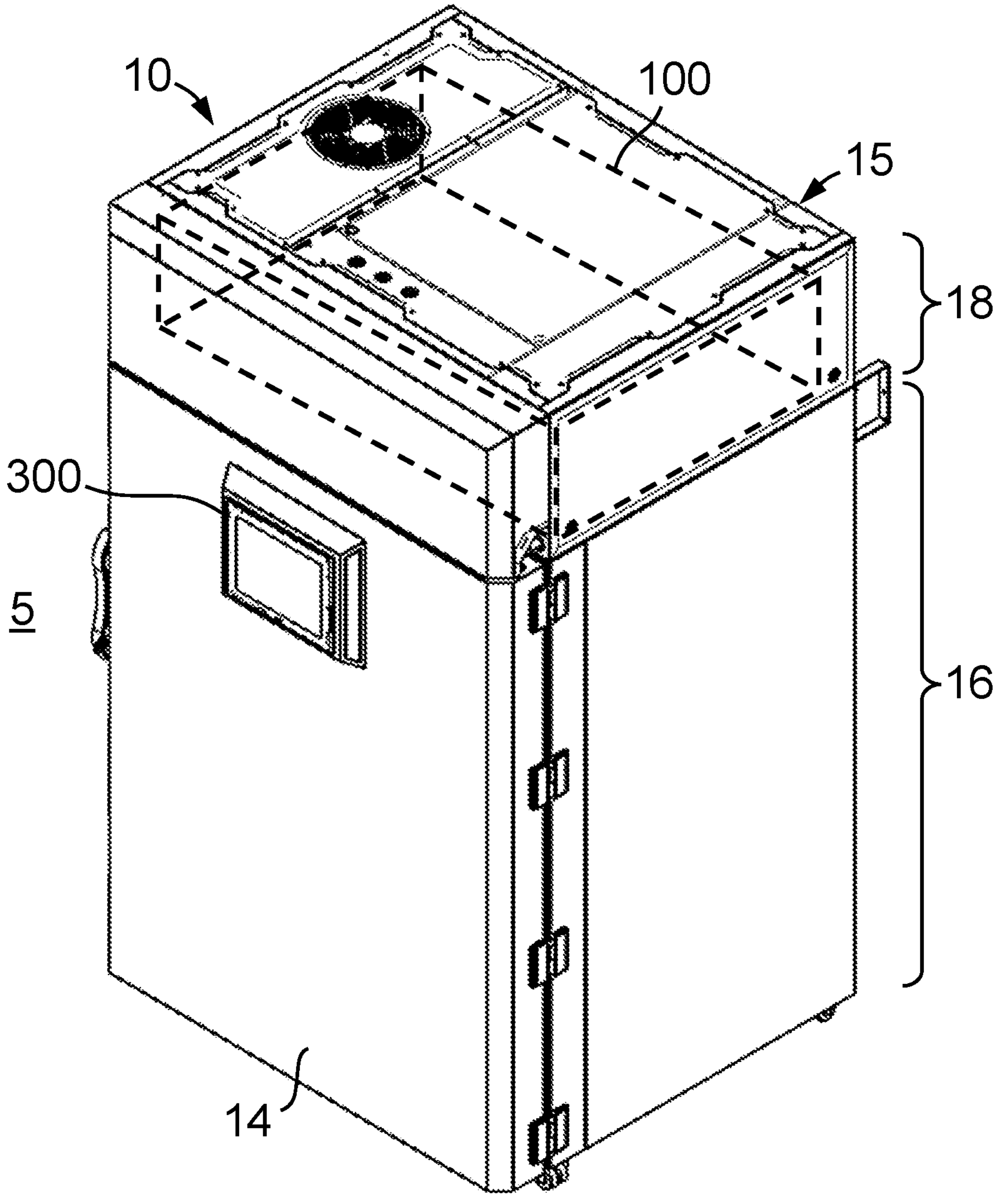
FIG. 1 is a perspective view of a cold storage system according to some embodiments disclosed herein.

As previously described, defrost operations in a cold storage system may not be optimal, or may introduce problems. For instance, a technological problem addressed and solved in various combinations of various features of various embodiments described herein, is that heat may be introduced into one or more locations of the cold storage system during (or as a result of) the defrost operation. This heat may enter the cold space chamber and result in an undesired rise in temperature within the cold space chamber.

A cold storage system may be used to store degradable materials, such as life science products and materials. Some cold storage systems are designed to achieve and maintain temperatures at or below −20° C., −50° C., −70° C., and in some cases be able to achieve, and maintain temperatures of −80° C. However, achieving and maintaining such low temperatures within a chamber that is otherwise surrounded by ambient, traditional room temperature, conditions may require careful design so as to ensure reliable and efficient operation.

For example, a cold storage system may include a refrigeration system that is configured to use forced airflow to control a temperature of a cold space chamber during operations. Specifically, the refrigeration system may include an evaporator configured to cool an airflow generated by a fan (or blower) that is circulated through the cold space chamber during normal refrigeration operations (or more simply "refrigeration operations"). When the evaporator is designed to operate at temperatures below the freezing point of water, in order to cool the chamber below the freezing point of water, frost may accumulate on a coil of the evaporator overtime, which may degrade a performance thereof. During a defrost operation, the fan may be deactivated and the temperature of the evaporator (e.g., such as the evaporator coil and/or the area surrounding the evaporator coil) may be increased (described in more detail below) by adding heat, to remove the accumulated frost. This increased temperature results in a volume of warm air surrounding the coil at the cessation of the defrost operation. After the defrost operation is ended, the refrigeration system may be returned to refrigeration operations (e.g., cooling) which may include reactivating the fan to restart the airflow. However, this initial reactivation of the fan following a defrost operation may drive the warmer air surrounding the evaporator coil into the cold space chamber, which may be disadvantageous, or even deteriorative to items stored in the cold space chamber (especially in the case of life-science products and materials as previously described).

For some embodiments, the technological solution presented herein is to successively activate and deactivate the evaporator fan over a controlled period of time after a defrost operation, e.g., in a post-defrost operation, so as to control a movement of the warm air accumulated during the defrost operation through the cold storage system and thereby minimize transfer of the accumulated heat to the cold space chamber (or contents stored therein). Such solutions may be implemented with open-loop control of the fan, or closed-loop control with feedback from a sensor (e.g. a temperature sensor), in various embodiments. In some embodiments, the fan may be operated at a lower speed during the post-defrost operation than during normal refrigeration operations. Some embodiments may obviate the need for expensive valving and dampers to release accumulated warm air externally to the cold storage system, although it is envisioned such features could be combined in further embodiments.

FIGS. 1-10 describe various embodiments of cold storage systems and forced air refrigeration systems, for which embodiments of fan control, defrost fan control, and refrigeration system control, as described herein may be suitable.

Figure 2:
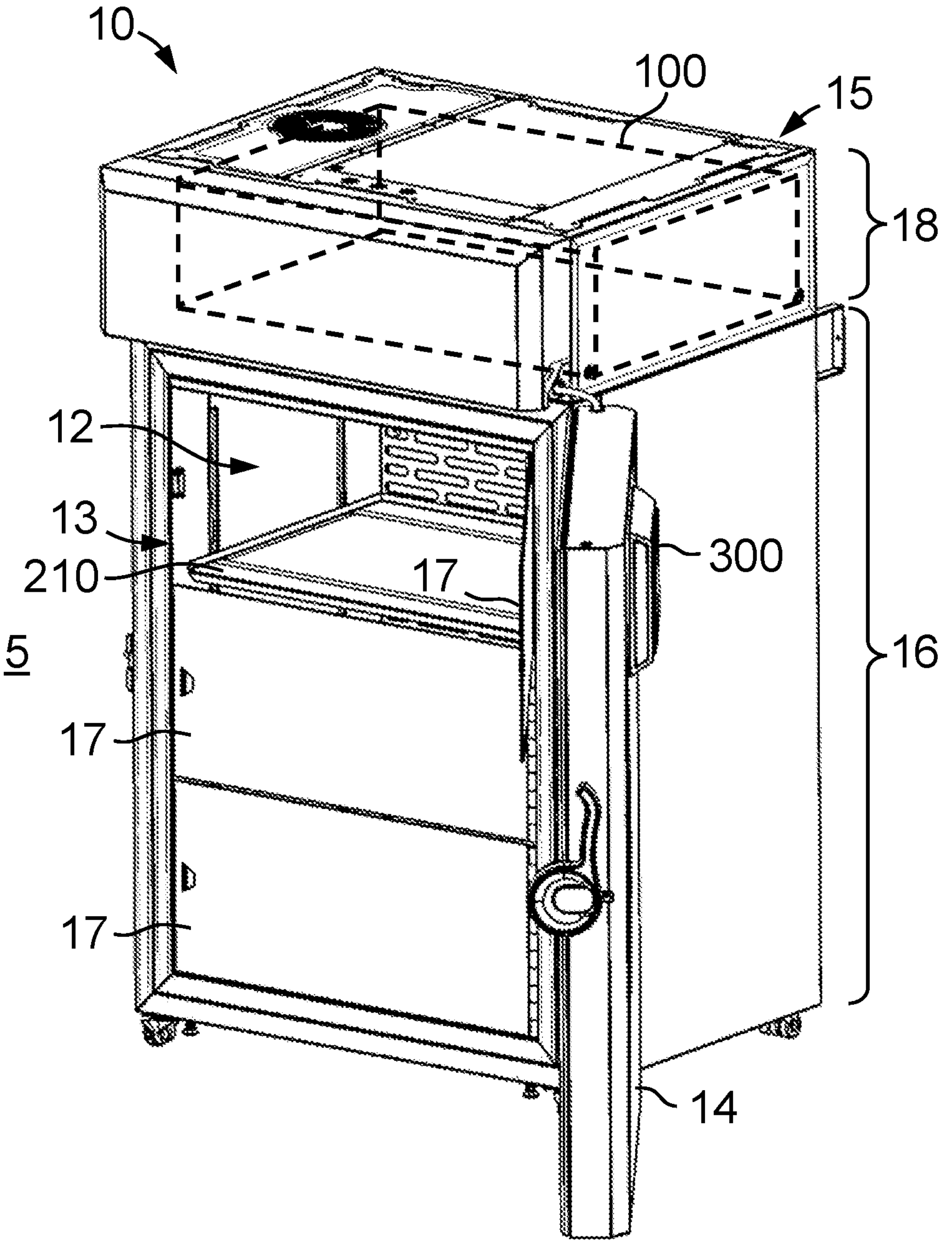
FIG. 2 is another perspective view of the cold storage system of FIG. 1, showing an outer door open to reveal an inner storage chamber therein according to some embodiments disclosed herein.
Figure 3:
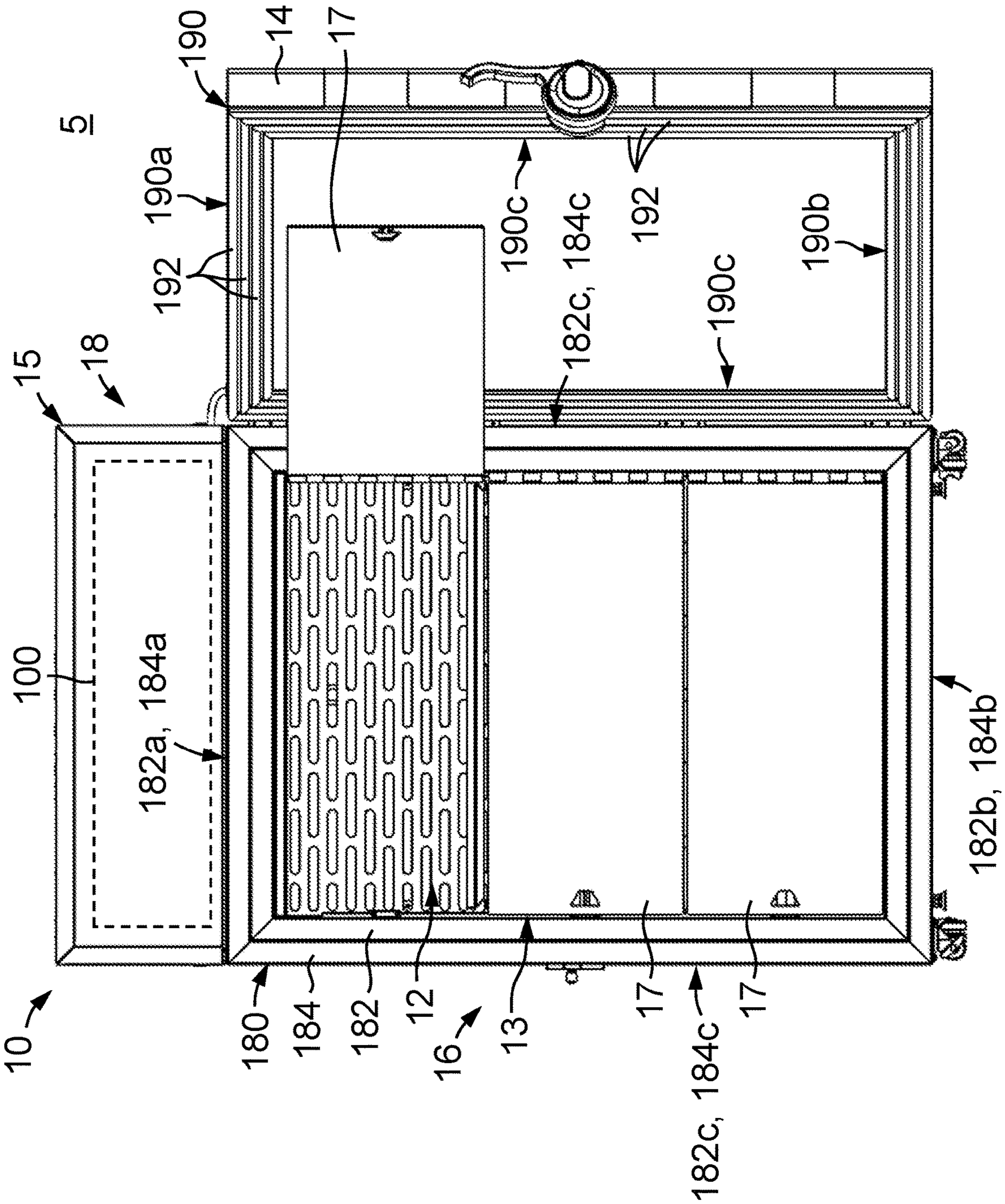
FIG. 3 is a front view of the cold storage system of FIG. 2 according to some embodiments disclosed herein.

Referring now to FIGS. 1-3, a cold storage system 10 according to some embodiments is shown. The cold storage system 10 may be configured to store degradable products (e.g., such as life-science products and materials) at temperatures below the freezing point of water (e.g., 0° C. or 32° F.) or lower. Thus, the cold storage system 10 may be more simply referred to herein as a "freezer." In some embodiment, the freezer may be configured to store products in ultra-low temperatures below −50° C. However, it should be appreciated that other embodiments of cold storage system 10 may be configured to store products at temperatures that are above the freezing point of water.

Generally speaking, the cold storage system 10 includes a housing 15 that defines one or more cold space chambers 12 (or more simply "chamber" or "chambers") therein. The housing 15 may be relatively compact so that the cold storage system 10 may be transportable or relatively portable. Thus, the cold storage system 12 may be readily moved or transported between rooms in a facility or between different facilities entirely.

In the embodiment illustrated in FIGS. 2 and 3, the housing 15 includes a single chamber 12 that is accessible via an outer door 14. Specifically, the chamber 12 may include a front opening 13 that is closeable by the outer door 14 during operations. Thus, the chamber 12 is at least partially defined by the outer door 14. When the door 14 is closed, to thereby occlude or cover the front opening 13 (FIG. 1), the chamber 12 is isolated or substantially closed-off from the surrounding environment 5, and when the door 14 is opened (FIGS. 2 and 3), the chamber 12 is exposed to the surrounding environment 5 via the front opening 13. In some embodiments, the cold storage system 10 may define a plurality of separate chambers 12 that may be accessible via the outer door 14 or a plurality of outer doors 14.

As shown in FIGS. 2 and 3, the chamber 12 may have one or more (e.g., a plurality of) inner doors 17 positioned therein that are configured to at least partially close the front opening 13 independently of the outer door 14. The one or more inner doors 17 may provide an additional barrier (that is, in addition to the outer door 14) to minimize air exchange between the chamber 12 and the ambient environment 5 when the outer door 14 is opened. The number and arrangement of inner doors 17 may correspond to the shelving or other organizational support structure (e.g., shelves 210) that is inserted within the chamber 12 so that a user may open an inner door 17 that is associated with a particular storage location (e.g., such as a particular shelf 210).

In addition, the cold storage system 10 includes a climate control assembly or system 100 that is operably coupled to the chamber 12. Specifically, the chamber 12 may be conditioned by a single climate control assembly 100 that is configured to achieve and/or maintain a desired temperature (or temperature range) within the chamber 12 during operations. The climate control assembly 100 may comprise a vapor compression refrigeration system or module (or more simply "refrigeration module") that circulates one or more refrigerants to exchange heat between the chamber 12 and environment 5 during operations. In some embodiments, the climate control assembly 100 may comprise a cascade refrigeration module that has a plurality of staged refrigerant circuits that are in thermal communication with one another and that are configured to achieve and/or maintain a low temperature within the chamber 12 during operations. Thus, the climate control assembly 100 may be referred to herein as a "refrigeration module" 100.

The housing 15 may define or include a first or upper portion 18 and a second or lower portion 16 that is positioned vertically below and lower than the upper portion 18. The refrigeration module 100 may substantially define the upper portion 18 and the chamber 12 may be at least partially positioned in the lower portion 16. Thus, the climate control system 100 (or at least the majority thereof) may be positioned vertically higher and indeed vertically above the chamber 12. In some embodiments, the refrigeration module 100 (and/or at least a portion of the upper portion 18) may be readily removed and replaced on the lower portion 16 of housing 15 (e.g., so as to facilitate replacement of the refrigeration module 100 in the event of failure). Additional features of the chamber 12 and climate control system 100 are provided herein according to some embodiments.

In addition, in some embodiments, the position of the refrigeration module 100 relative to the chamber 12 and lower portion 16 of housing 15 may be varied. For instance, in some embodiments, the refrigeration module 100 (or a portion thereof) may be placed along a lateral side or back of the lower portion 16 of housing 15, or even potentially along a bottom side of the lower portion 16 of housing 15.

The freezer 10 may operate using electrical power supplied from a line power source (e.g., a local electrical grid). In addition, the freezer 10 may include (or be coupled to) one or more back-up batteries, capacitors, generators, etc. (collectively "back-up power sources"—not shown) to ensure freezer 10 remains operable in the event of a failure of the line power source. In some embodiments, one or more back-up power sources may operate a user interface (e.g., user interface 300 described herein) and one or more sensors (e.g., temperature sensor 128) of freezer 10, but a remainder of the freezer 10 may become inoperable upon a loss or failure of the line power source.

Figure 4:
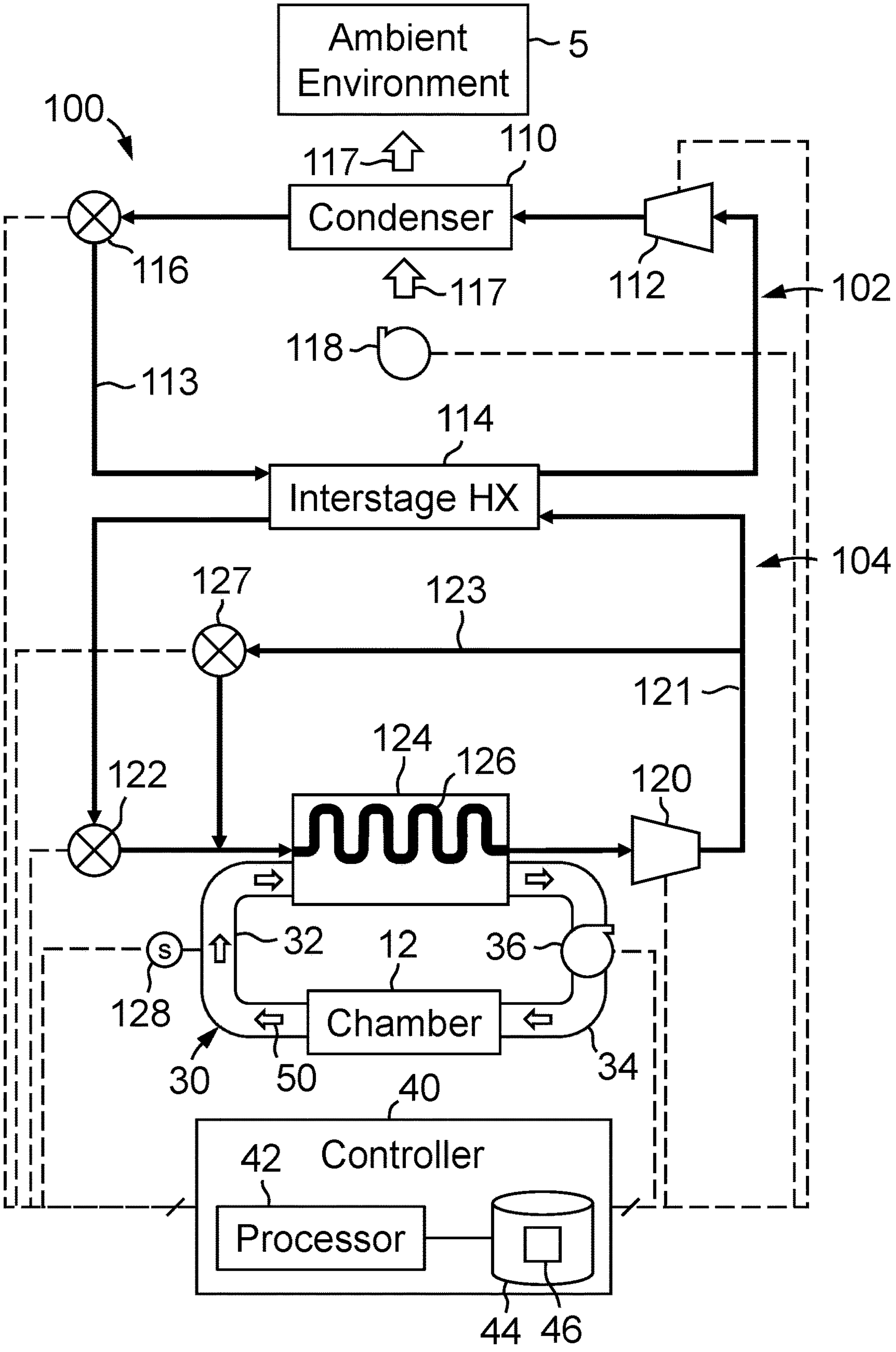
FIG. 4 is a schematic view of a climate control assembly of the cold storage system of FIG. 1 according to some embodiments disclosed herein.

FIG. 4 shows a schematic diagram of the refrigeration module 100 of freezer 10 according to some embodiments. As previously described, in some embodiments the refrigeration module 100 is configured circulate a refrigerant (or multiple refrigerants) to cool the chamber 12 during operations. In particular, the climate control module 100 may comprise a so-called cascade refrigeration assembly that includes a plurality of separate, staged refrigerant circuits 113, 121 that are thermally coupled to one another for transferring heat between the chamber 12 and the ambient environment 5. In some embodiments, the refrigeration module 100 may be configured to achieve and/or maintain low temperatures in the chamber 12 (e.g., such as "ultra-low" temperatures as previously described).

As shown in FIG. 4, the refrigeration module 100 may include a first refrigeration stage 102 (or more simply "first stage" 102) having a first refrigerant circuit 113 that circulates a first refrigerant, and a second refrigeration stage 104 (or more simply "second stage" 104) having a second refrigerant circuit 121 that circulates a second refrigerant. The first and second refrigerants may comprise any suitable refrigerant or combination of refrigerants such as, for instance one or more chlorofluorocarbons, hydrochlorofluorocarbons, hydrocarbons, ammonia, etc. The first and second refrigerants may be different from one another, and particularly may have different phase change temperatures. The first and second refrigerants may be selected so that at the operating pressures of the first and second refrigerant circuits 113, 121, the saturated condensing temperature range of the second refrigerant (in the second refrigerant circuit 121) overlaps with saturated evaporating temperature of the first refrigerant (in the first refrigerant circuit 113) in an interstage heat exchanger (e.g., the interstage heat exchanger 114 described herein) so that each of the first refrigerant and second refrigerant may experience a change in enthalpy when thermally interacting with one another during operations (e.g., via the interstage heat exchanger 114 described herein).

Generally speaking, during operations, the refrigeration module 100 may circulate the first and second refrigerants through the first and second refrigerant circuits 113, 121, respectively, in order to transfer heat from the chamber 12 to the ambient environment 5. Heat may be transferred between the first and second refrigerants via an interstage heat exchanger 114 that is coupled to and is a part of each of the first refrigerant circuit 113 and second refrigerant circuit 121.

More specifically, the first refrigerant circuit 113 may circulate the first refrigerant between a first stage compressor 112 (or more simply "compressor" 112), a condenser 110, a first stage expansion valve 116 (or more simply "expansion valve" or "valve" 116), and the interstage heat exchanger 114 in order to transfer heat from the second refrigerant circuit 121 to the ambient environment 5. Specifically, the compressor 112 may compress the first refrigerant and output the compressed first refrigerant to the condenser 110. The first refrigerant flowing to and through the compressor 112 may be in (or substantially in) a vapor state due to heat exchange within the interstage heat exchanger 114. The condenser 110 may comprise a heat exchanger (or collection of heat exchangers) that is configured to cool the first refrigerant by transferring heat from the first refrigerant to the ambient environment 5 via convection, radiation, and/or any other suitable mode of heat transfer. For instance, in the embodiment illustrated in FIG. 4, a blower or fan 118 may generate an airflow 117 that is in thermal contact with the first refrigerant via the condenser 110 so that during operations the first refrigerant transfers heat to the airflow 117 and cools, so as to condense or partially condense from a vapor into a liquid. The heated airflow 117 may flow outward and away from the condenser 110 and into the ambient environment 5. In some embodiments, the condenser 110 may transfer heat from the first refrigerant to the ambient environment 5 via natural convection and/or radiation either in addition or in alternative to the forced convection via airflow 117. Accordingly, in some embodiments, the fan 118 may be omitted.

The liquid (or at least partially liquid) first refrigerant may be emitted from the condenser 110 and then expanded through the expansion valve 116 so as to at least partially vaporize and further cool the first refrigerant. Thereafter, the cooled first refrigerant is flowed into the interstage heat exchanger 114.

Within the interstage heat exchanger 114, heat is transferred from the second refrigerant flowing the second refrigerant circuit 121 to the first refrigerant so that the first refrigerant changes phase (or substantially changes phase) in the interstage heat exchanger 114 from a liquid to a vapor. Thus, the interstage heat exchanger 114 may function as an evaporator for the first refrigerant of the first refrigerant circuit 113. The heated and vaporized (or partially vaporized) first refrigerant is then emitted from the interstage heat exchanger 114 and flowed back to the first stage compressor 112 to restart the cycle described above. Further details of interstage heat exchanger 114 are described herein according to at least some embodiments of refrigeration module 100 (FIG. 22).

Referring still to FIG. 4, the second refrigerant circuit 121 may circulate the second refrigerant between a second stage compressor 120 (or more simply "compressor" 120), the interstage heat exchanger 114, a second stage expansion valve 122 (or more simply "expansion valve" or "valve" 122), and an evaporator 124, in order to transfer heat from the chamber 12 to the first refrigerant circuit 113. Specifically, the compressor 120 may compress the second refrigerant and output the compressed second refrigerant to the interstage heat exchanger 114. The second refrigerant flowing to and through the compressor 120 may be in (or substantially in) a vapor state due to heat exchange within the evaporator 124. Within the interstage heat exchanger 114, heat may be transferred from the second refrigerant to the first refrigerant as previously described. As a result, within the interstage heat exchanger 114, the second refrigerant may cool so as to condense or partially condense from a vapor into a liquid. Thus, the interstage heat exchanger 114 may function as a condenser for the second refrigerant of the first refrigerant circuit 121.

The liquid (or at least partially liquid) second refrigerant may be emitted from the interstage heat exchanger 114 and then expanded through the expansion valve 122 so as to at least partially vaporize and further cool the second refrigerant. Thereafter, the cooled second refrigerant is flowed into the evaporator 124.

The evaporator 124 is a heat exchanger that is configured to transfer heat from the chamber 12 to the second refrigerant. Specifically, the cooled second refrigerant is flowed through a coil 126 that is thermally exposed to an airflow 50 in the evaporator 124 (e.g., so that the airflow 50 is in thermal communication with the evaporator 124) so that heat is transferred from the airflow 50 to the second refrigerant to thereby cause the second refrigerant to change phase (or substantially change phase) from a liquid to a vapor. The airflow 50 may be generated by a blower or fan 36 that is in fluid communication with ducting 30 that is configured to direct the airflow 50 between the chamber 12 and evaporator 124 during operations. Specifically, the ducting 30 includes a suction duct 32 that is configured to direct the airflow 50 from the chamber 12 to the evaporator 124, and a discharge duct 34 that is configured direct the airflow 50 from the evaporator 124 to the chamber 12. The blower 36 may be positioned along or adjacent to the discharge duct 34; however, other positions for the blower 36 are contemplated herein (e.g., such as in the suction duct, in the chamber 12, etc.).

Referring still to FIG. 4, during operations, the refrigeration module 100 may substantially lower the temperature in the chamber 12. As previously described, the refrigeration module 100 may be configured to achieve and/or maintain ultra-low temperatures (e.g., below-50° C.) in the chamber 12, with the ambient environment 5 being maintained at normal indoor conditions (e.g., such as temperatures in a range of about 18-24° C. (about 65-75° F.) and relative humidity levels in a range of about 30-60% in some examples). In some embodiments, the ambient environment 5 may include temperatures that are less than normal indoor conditions (e.g., less than 18° C. or 65° F.), but may still be warmer than the temperature in the chamber 12. Air at temperatures warmer than that of the chamber 12 may also include greater relative humidity values than that found in the chamber 12. As a result, when the outer door 14 is opened, the relatively warm and humid air from the ambient environment 5 may flow into the substantially colder chamber 12 and eventually cause ice formation therein. Of particular note, the airflow 50 circulating between the evaporator 124 and the chamber 12 may lead to substantial ice formation on the coil 126 of the evaporator 124, which may degrade the heat transfer functionality of the evaporator 124. As a result, the refrigeration module 100 may periodically perform a defrost operation to remove ice that has accumulated on the coil 126. The defrost operation may include a so-called "hot gas bypass" and/or a separate supplemental heat source.

For instance, in some embodiments, the refrigeration module 100 may utilize a hot gas bypass to defrost the evaporator 124 during operations. Specifically, the second refrigerant circuit 121 may include a bypass line 123 that is configured to recycle compressed second refrigerant discharged from the compressor 120 back to the evaporator 124 in bypass of the interstage heat exchanger 114 and expansion valve 122. Specifically, a valve 127 may be positioned along the defrost bypass line 123 to control a flow of second refrigerant there along. During a defrost operation, the expansion valve 122 may be closed to prevent (or at least restrict) the flow of second refrigerant from the interstage heat exchanger 114 to the evaporator 124, and the valve 127 may be opened to initiate the flow of compressed and relatively warm second refrigerant from the compressor 120 back to the evaporator 124 to thereby melt ice that has accumulated on the coil 126.

In some embodiments, the refrigeration module 100 may defrost the coil 126 of the evaporator 124 via other methods. For instance, separate, supplemental heat sources (e.g., electrically resistive heating elements) may be positioned proximate to the coil 126 to melt accumulated ice. In some embodiments, the separate heat sources may comprise a heat generating assembly (e.g., a resistive heater or other suitable heating device or assembly) that is positioned outside of the enclosure 150 (e.g., such as attached to an outer surface of the housing 15), and the supplemental heat is delivered to the coil 126 via a conductive medium (e.g., a heat pipe, vapor chamber, solid diamond rod, etc.) As a result, in some embodiments, the defrost bypass line 123 may be omitted from the second refrigerant circuit 121. In other embodiments, particularly where a single refrigeration circuit is used, the circuit may be provided with a 3-way switch over valve to permit the direction of flow of refrigerant to reverse and resulting in the evaporator 124 acting like a condenser.

Performing a defrost operation may also require additional sources of heat to be added to the system and resulting in warming the air surrounding the evaporator. For example, it is important that the ice that melts from the evaporator 124 is permitted to be collected and evacuated from the refrigeration assembly 100 prior to re-freezing. Therefore, in some embodiment a heater 129 (e.g., an electrically resistive heater) may be configured to warm a drain pan 131 positioned at least partially under the evaporator 124 (see FIG. 5) to keep the melted water from refreezing while it drains from the system. The heater 129 may be coupled to or integrated with the drain pan 131. As a consequence of the operation of heater 129, heat may be added to the air surrounding the coil 126.

A controller 40 may be communicatively coupled (via any suitable wired and/or wireless connection(s)) to various components of the refrigeration module 100 (e.g., compressors 112, 120, condenser 110, expansion valves 116, 122, valve 127, etc.). As described in more detail herein, the controller 40 may at least partially direct or control the operation of the refrigeration module 100 during operations. The controller 40 may be (or may be incorporated within) a main or master controller for the freezer 10, or the controller 40 may be a standalone controller 40 for controlling the refrigeration module 100 or a portion thereof. Regardless, the controller 40 may be described and referred to herein as being a part of the refrigeration module 100 and more broadly part of the freezer 10 (FIGS. 1-3).

The controller 40 may comprise one or more computing devices, such as a computer, tablet, smartphone, server, circuit board, or other computing device(s) or system(s). Thus, controller 40 may include a processor 42 and a memory 44.

The processor 42 may include any suitable processing device or a collection of processing devices. In some embodiments, the processor 42 may include a microcontroller, central processing unit (CPU), graphics processing unit (GPU), timing controller (TCON), scaler unit, or some combination thereof. During operations, the processor 42 executes machine-readable instructions (such as machine-readable instructions 46) stored on memory 44, thereby causing the processor 42 to perform some or all of the actions attributed herein to the controller 40. In general, processor 42 fetches, decodes, and executes instructions (e.g., machine-readable instructions 46). In addition, processor 42 may also perform other actions, such as, making determinations, detecting conditions or values, etc., and communicating signals. If processor 42 assists another component in performing a function, then processor 42 may be said to cause the component to perform the function.

The memory 44 may be any suitable device or collection of devices for storing digital information including data and machine-readable instructions (such as machine-readable instructions 46). For instance, the memory 44 may include volatile storage (such as random-access memory (RAM)), non-volatile storage (e.g., flash storage, read-only memory (ROM), etc.), or combinations of both volatile and non-volatile storage. Data read or written by the processor 42 when executing machine-readable instructions 46 can also be stored on memory 44. Memory 44 may include "non-transitory machine-readable medium," where the term "non-transitory" does not include or encompass transitory propagating signals.

The processor 42 may include one processing device or a plurality of processing devices that are distributed within (or communicatively coupled to) controller 40 or more broadly within refrigeration assembly 100 and/or freezer 10 (FIGS. 1-3). Likewise, the memory 44 may include one memory device or a plurality of memory devices that are distributed within (or communicatively coupled to) controller 40 or more broadly within refrigeration module 100 and/or freezer 10 (FIGS. 1-3). Thus, the controller 40 may comprise a plurality of individual "controllers" distributed throughout the climate control module 100 and/or freezer 10 (FIGS. 1-3).

The controller 40 may be communicatively coupled (e.g., via wired and/or wireless connection(s)) to one or more components of the refrigeration module 100. For example, as shown in FIG. 4, the controller 40 may be communicatively coupled to the compressors 112, 120, valves 116, 122, 127, blowers 118, 36, or some subset thereof. During operations, the controller 40 may control an operating condition of a component of the climate control module 100. For instance, the controller 40 may change an operating condition of one or both of the compressors 112, 120, and/or blowers 118, 36 such as by activating, deactivating, and/or changing an operating speed of one or both of the compressors 112, 120 and/or blowers 118, 36 during operations. Similarly, the controller 40 may change an operating condition of one or more of the valves 116, 122, 127 such as by changing a position thereof (e.g., open, closed, or some position therebetween). In some embodiments, the controller 40 may change an operating condition of one or both of the compressor 112, 120 and/or one or more of the valves 116, 122, 127 so as to achieve or maintain a desired temperature in the chamber 12.

In some embodiments, a temperature sensor 128 may be in fluid communication with the airflow 50. Specifically, the temperature sensor 128 may be positioned along the suction duct 32 (or elsewhere in the ducting 30 and/or chamber 12). Without being limited to this or any other theory, the airflow 50 entering the suction duct 32 may be heated due to contact with the chamber 12 (and products stored therein). As a result, the suction duct 32 may represent the location where the airflow 50 reaches its maximum average temperature during operations. Thus, placement of the temperature sensor 128 in the suction duct 32 may allow controller 40 to control the refrigeration assembly 100 based on a highest average temperature of the airflow 50 during operations. However, it should be appreciated that other locations for the temperature sensor 128 are contemplated herein, such as directly within the chamber 12, in the discharge duct 34, etc. In addition, in other embodiments, multiple temperature sensors (e.g., temperature sensor 128) may be positioned through the chamber 12, ducting 30, or elsewhere.

The controller 40 may be communicatively coupled to the temperature sensor 128 (or the multiple temperature sensors 128) and may be configured to control an operating condition of the refrigeration module 100 (or a component thereof) based at least in part on an output from the temperature sensor 128 during operations. For example, the controller 40 may activate or deactivate the refrigeration module 100 (or a portion thereof) based on an output from the temperature sensor 128. Specifically, the controller 40 may activate the compressors 112, 120 and blowers 36, 118 so as to circulate the first and second refrigerants through the first refrigerant circuit 113 and second refrigerant circuit 121, respectively, as previously described, at least partially in response to an output from the temperature sensor 128 that is indicative of a temperature in the suction duct 32 being above a target value. Conversely, the controller 40 may deactivate the compressors 112, 120 and blowers 36, 118 so as to cease circulation of the first and second refrigerant through the first refrigerant circuit 113 and second refrigerant circuit, respectively, as previously described at least partially in response to an output from the temperature sensor 128 that is indicative of a temperature in the suction duct 32 being below a target value. In addition, the controller 40 may adjust a position of the valves 116, 122 and/or or an operating speed of the compressors 112, 120 and/or blowers 36, 118 so as to actively change a cooling capacity of the refrigeration assembly 100 based at least in part on an output from the temperature sensor 128.

Figure 5:
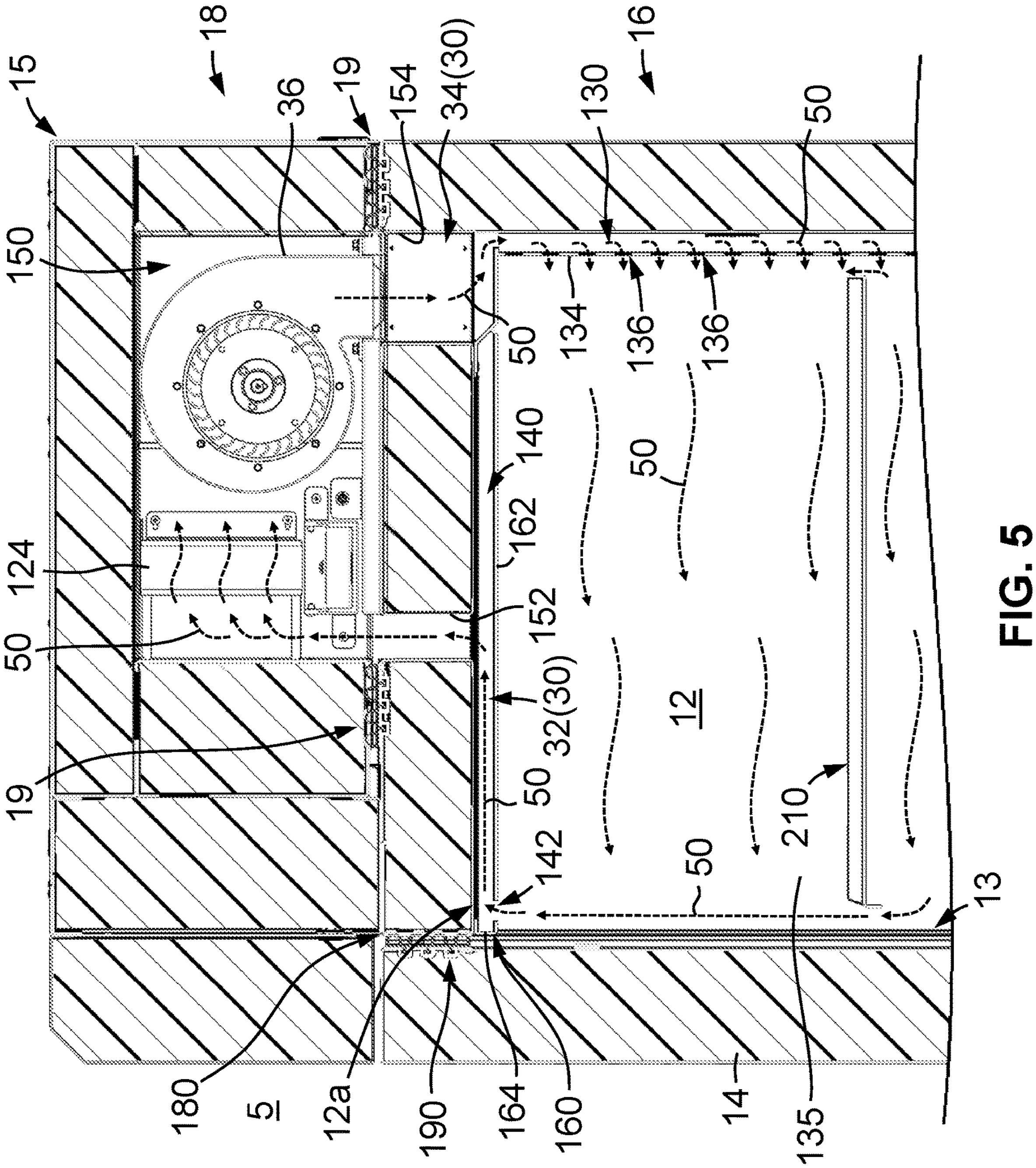
FIG. 5 is an enlarged, partial side cross-sectional view of the cold storage system of FIG. 1 illustrating an airflow between the inner storage chamber and an evaporator according to some embodiments disclosed herein.

FIG. 5 shows an example path for the airflow 50 through the chamber 12, ducting 30, and evaporator 124 (FIG. 4) according to some embodiments of freezer 10 (FIGS. 1-3). In particular, FIG. 5 shows a side cross-sectional view of the freezer 10—however, it should be noted that some features have been simplified or occluded by additional cross-hatching in order to simplify the drawing and to focus on the example path for the airflow 50 according to some embodiments. As shown in FIG. 5, the evaporator 124 and blower 36 may be co-located in an enclosure 150 that is formed in the upper portion 18 of housing 15. The enclosure 150 may be positioned vertically above the chamber 12. The enclosure 150 may substantially define the volume of air that would be heated as part of the defrost operation discussed above if the airflow 50 were stopped by deactivating the blower 36.

Figure 6:
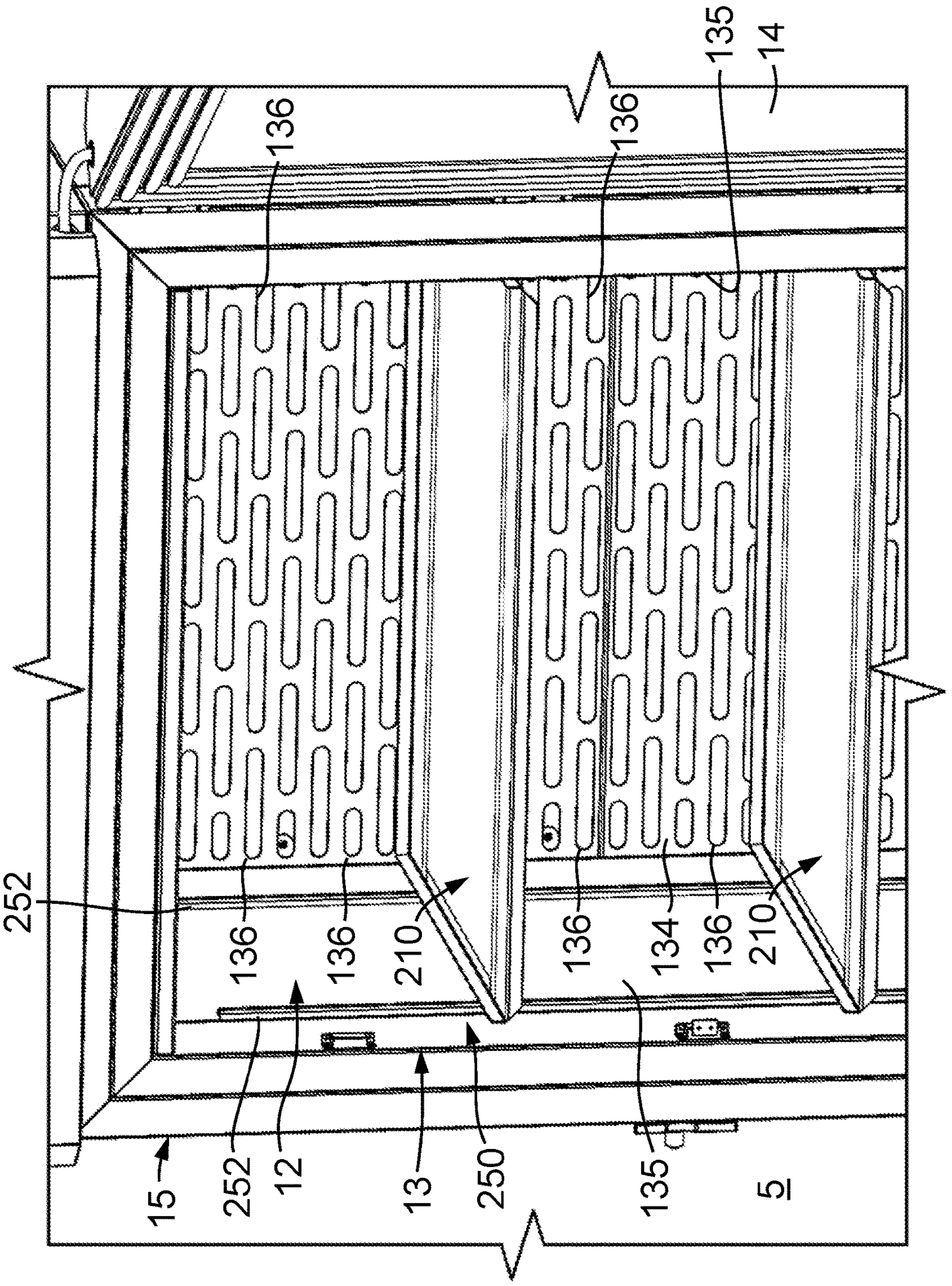
FIG. 6 is an enlarged, perspective view of the inner storage chamber of the cold storage system of FIG. 1 according to some embodiments disclosed herein.

The discharge duct 34 (of ducting 30) may include a discharge manifold 130 that is positioned adjacent to the chamber 12. Specifically, the chamber 12 may have a back wall 134 that is opposite the front opening 13 and that separates the discharge manifold 130 from the chamber 12. A pair of side walls 135 may extend laterally between the back wall 134 and the front opening 13 (only one of the side walls 135 is visible in the cross-section of FIG. 5). Thus, the discharge manifold 130 may be defined in the housing 15, behind a rear or back side of the chamber 12. The back wall 134 may include one or more (e.g., one or a plurality of) outlets 136 defined therein that are configured to place the chamber 12 in fluid communication with the discharge manifold 130 during operations. Referring briefly to FIG. 6, the plurality of outlets 136 may comprise a plurality of elongated slots that generally have an elongate pill shape that is elongated on the horizontal or lateral direction (e.g., substantially perpendicular to the direction of gravity). However, any suitable shape and arrangement of the outlets 136 is contemplated herein.

Figure 7:
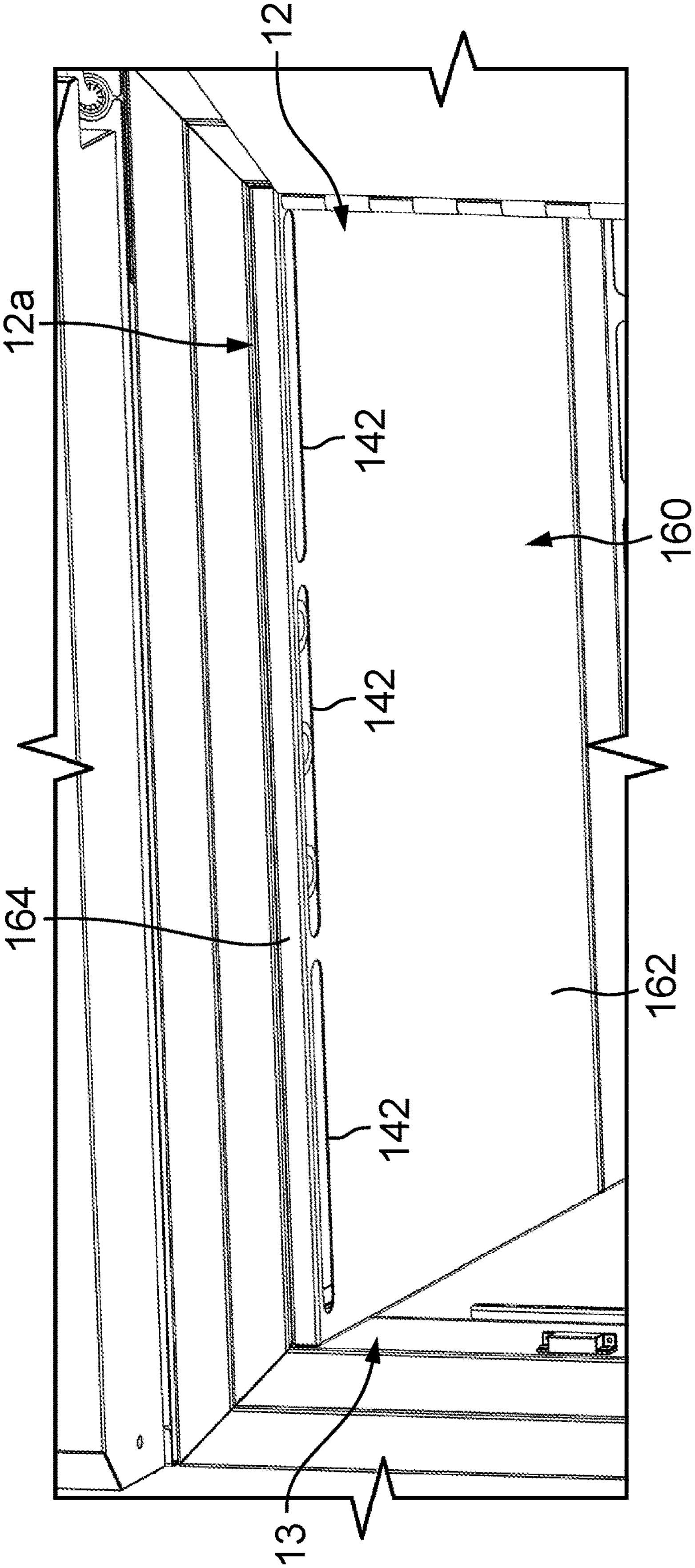
FIG. 7 is another enlarged, perspective view of the inner storage chamber of the cold storage system of FIG. 1 according to some embodiments disclosed herein.

Referring again to FIG. 5, the suction duct 32 (of ducting 30) may include a suction manifold 140 that is positioned at an upper end 12*a* of chamber 12. The upper end 12*a* of chamber 12 may be a vertically upper end (e.g., relative to the direction of gravity), and may comprise an end of the chamber 12 that is most proximate the chamber 150 (and thus evaporator 124 and blower 36). The suction manifold 140 may be in fluid communication with the chamber 12 via one or more (e.g., one or a plurality of) inlets 142. The inlets 142 may thus be positioned in an upper portion of the chamber 12 that is proximate to the upper end 12*a*. In addition, the inlets 142 may be positioned more proximate the front opening 13 and door 14 than the back wall 134 in a lateral or horizontal direction within the chamber 12 (e.g., perpendicular to the direction of gravity). Referring briefly to FIG. 7, in some embodiments the inlets 142 may be similarly shaped to the plurality of outlets 136, and thus may be formed as elongated pill-shaped slots (however, as with outlets 136, other shapes are contemplated).

Referring again to FIG. 5, the suction manifold 140 may be in fluid communication with the enclosure 150 via a suction port 152, and the discharge manifold 130 may be in fluid communication with the enclosure 150 via a discharge port 154. Together, the suction manifold 140, suction port 152, and a first portion of the enclosure 150 (e.g., a portion upstream of the blower 36) may define the suction duct 32 of ducting 30, and the discharge manifold 130, discharge duct 154, and a second portion of the enclosure 150 (e.g., the portion including, and downstream of, the blower 36) may define the discharge duct 34 of ducting 30 as depicted in FIG. 4.

The arrangement of the manifolds 130, 140, outlets 136, and inlets 142 in the chamber 12 may facilitate a back-to-front and vertically upward flow direction for the airflow 50 in the chamber 12 during operations. Specifically, the blower 36 may discharge the airflow 50 vertically downward through the discharge port 154 and into the discharge manifold 130. Thereafter, the airflow 50 may flow out of the discharge manifold 130 and into the chamber 12 via the plurality of outlets 136. As shown in FIG. 5, the airflow 50 may change directions as it flows from discharge port 154 to the discharge manifold 130—specifically changing directions from vertical to lateral and then from lateral to vertical when flowing from the discharge port 154 into the discharge manifold 130. The plurality of outlets 136 may be shaped, numbered, and arranged so as to place a sufficient back pressure on the discharge manifold 130 to provide relatively even outflow of the airflow 50 across the plurality of outlets 136. The airflow 50 entering the chamber 12 via the plurality of outlets 136 on the back wall 134 may be generally horizontal or lateral in direction. Thus, the general direction of the airflow 50 may be horizontal or lateral in the chamber 12 from the back wall 134 toward the front opening 13 (or door 14). In addition, the airflow 50 may generally flow vertically upward in the chamber 12 toward the plurality of inlets 142. Due to the back-to-front lateral direction of the airflow 50 previously described, a substantial portion of the airflow 50 may flow vertically upward in the chamber 12 at or proximate to the front opening 13 and outer door 14 (and inner doors 17 as shown in FIGS. 2 and 3).

After entering the suction manifold 140 via the plurality of inlets 142, the airflow 50 may change direction from vertical to horizontal or lateral and may progress through the suction manifold 140 to the suction port 152. The airflow 50 may then change direction again from lateral to vertical in the suction port 152, and may progress vertically through the suction port 152 into the enclosure 150. Upon entering the enclosure 150, the airflow 50 may once again change direction from vertical to lateral so as to progress through the enclosure 150 through, over, and/or across the evaporator 124. As the airflow 50 thermally engages with the evaporator 24, heat from the airflow 50 is transferred to the second refrigerant (FIG. 4) flowing through the evaporator 124 so that the temperature of the airflow 50 is reduced. Thereafter, the cooled airflow 50 is pulled into the blower 36 to restart the cycle described above.

Without being limited to this or any other theory, heat in the chamber 12 may tend to rise vertically via natural convection (that is, independent of the airflow 50). As a result, placing the evaporator 124 in the chamber 150 vertically above the chamber 12 may take advantage of this natural migration of heat so as to more efficiently encourage relatively warmer air to flow toward the evaporator 124. More specifically, the vertically upward direction of airflow 50 within the chamber 12 may work in concert with natural convection so as to more efficiently sweep relatively warmer air out of the chamber 12 and toward the evaporator 124 via suction ducting 32. Accordingly, the general arrangement of the evaporator 124, chamber 12, and ducting 30 may more efficiently eliminate heat from the chamber 12 so that temperatures may be more efficiently and reliably lowered therein. In addition, again without being limited to this or any other theory, the multiple direction changes described above for the airflow 50 when the airflow 50 is progressing into the chamber 12 from the enclosure 150, from the chamber 12 to the enclosure 150, and through the enclosure 150 itself may be configured to restrict or minimize unintentional mixing of air in the chamber 12 and enclosure 150 when the blower 36 is not operating (e.g., such as during a defrost operation).

Referring now to FIGS. 5 and 7-10, the suction manifold 140 may be at least partially formed or defined by a tray 160 that is removably inserted into the chamber 12 at (or proximate to) the upper end 12*a*. Specifically, the tray 160 may have a planar base 162 and one or more side walls 164 extending normally away from the base 162. The tray 160 may be inserted into the chamber 12 so that the base 162 extends substantially laterally or horizontally, such that the one or more side walls 164 extends generally vertically upward from the base 162. In addition, when the tray 160 is inserted into the chamber 12, the base 162 and side wall(s) 164 of the tray 160 and the upper end 12*a* of the chamber 12 may define the suction manifold 140 in the chamber 12, and the inlets 142 may be positioned along the base 162.

Figure 8:
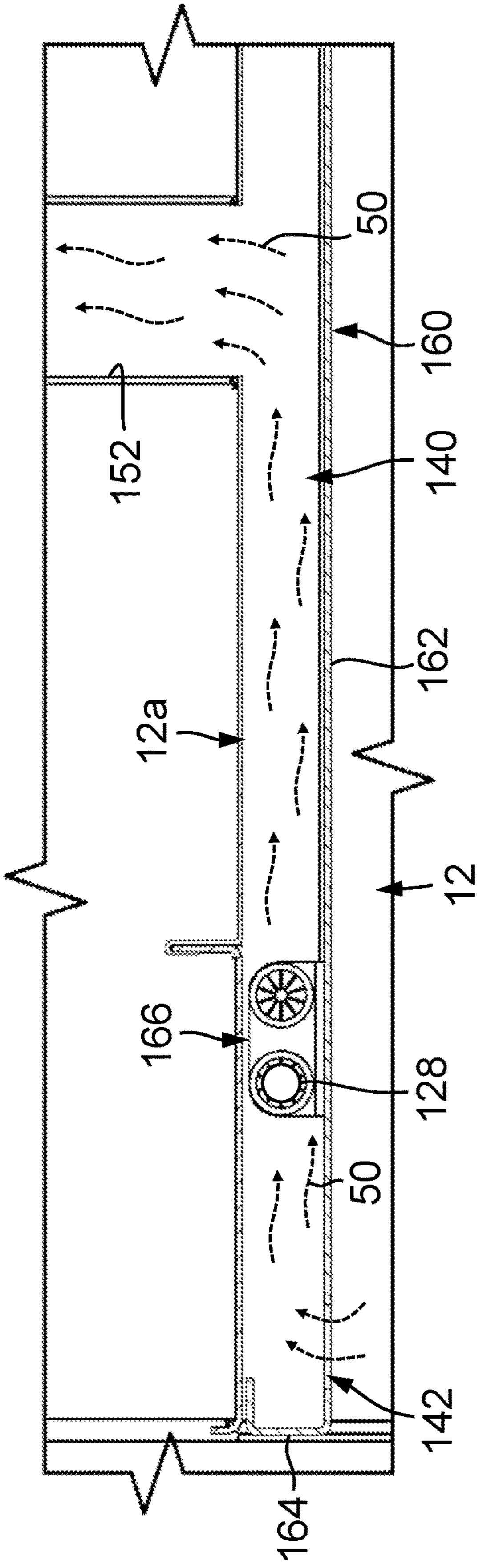
FIG. 8 is an enlarged, partial side cross-sectional view of a portion of suction duct of the cold storage system of FIG. 1 according to some embodiments disclosed herein.
Figure 9:
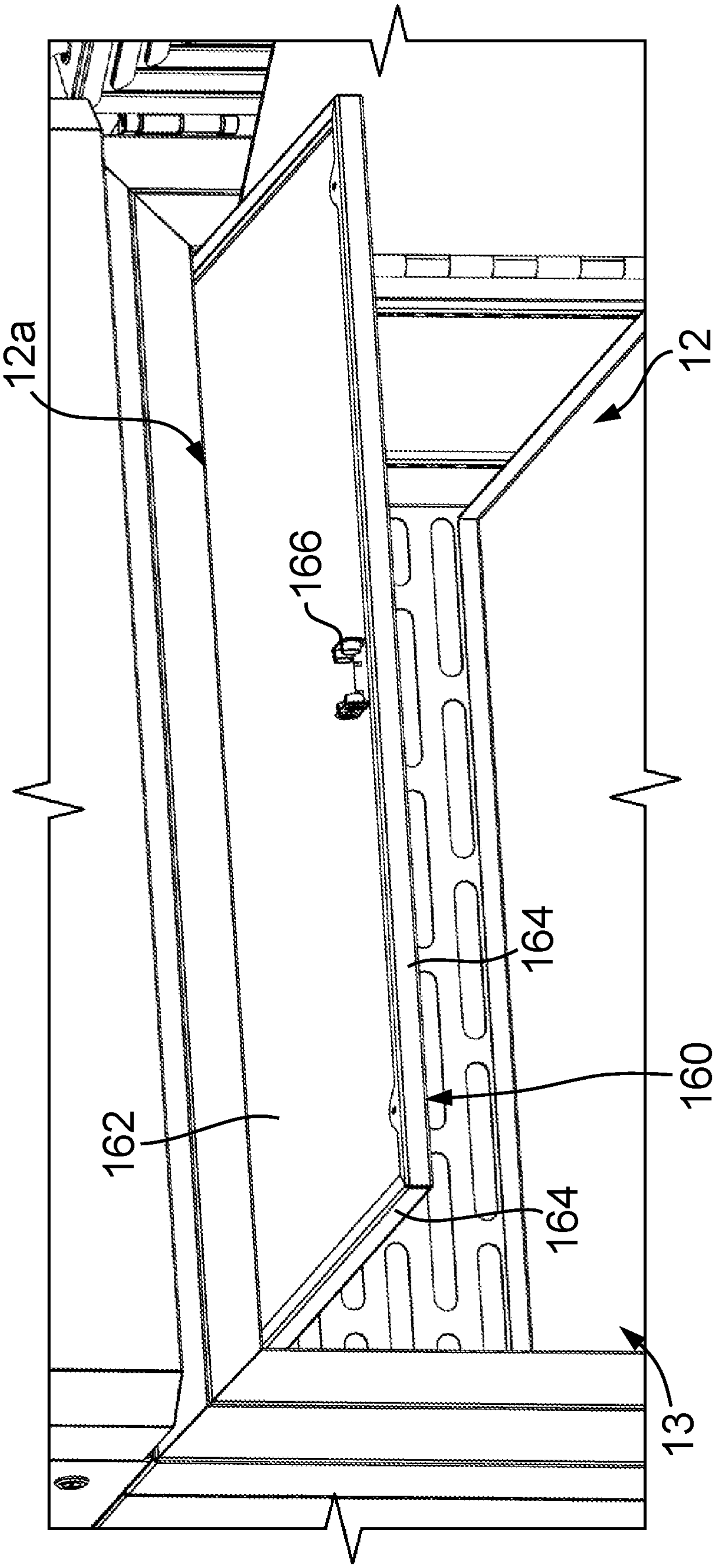
FIG. 9 is an enlarged perspective view of the inner storage chamber of the cold storage system of FIG. 1, illustrating a tray that at least partially defines the suction duct of FIG. 8 pulled out from the inner storage chamber according to some embodiments disclosed herein.
Figure 10:
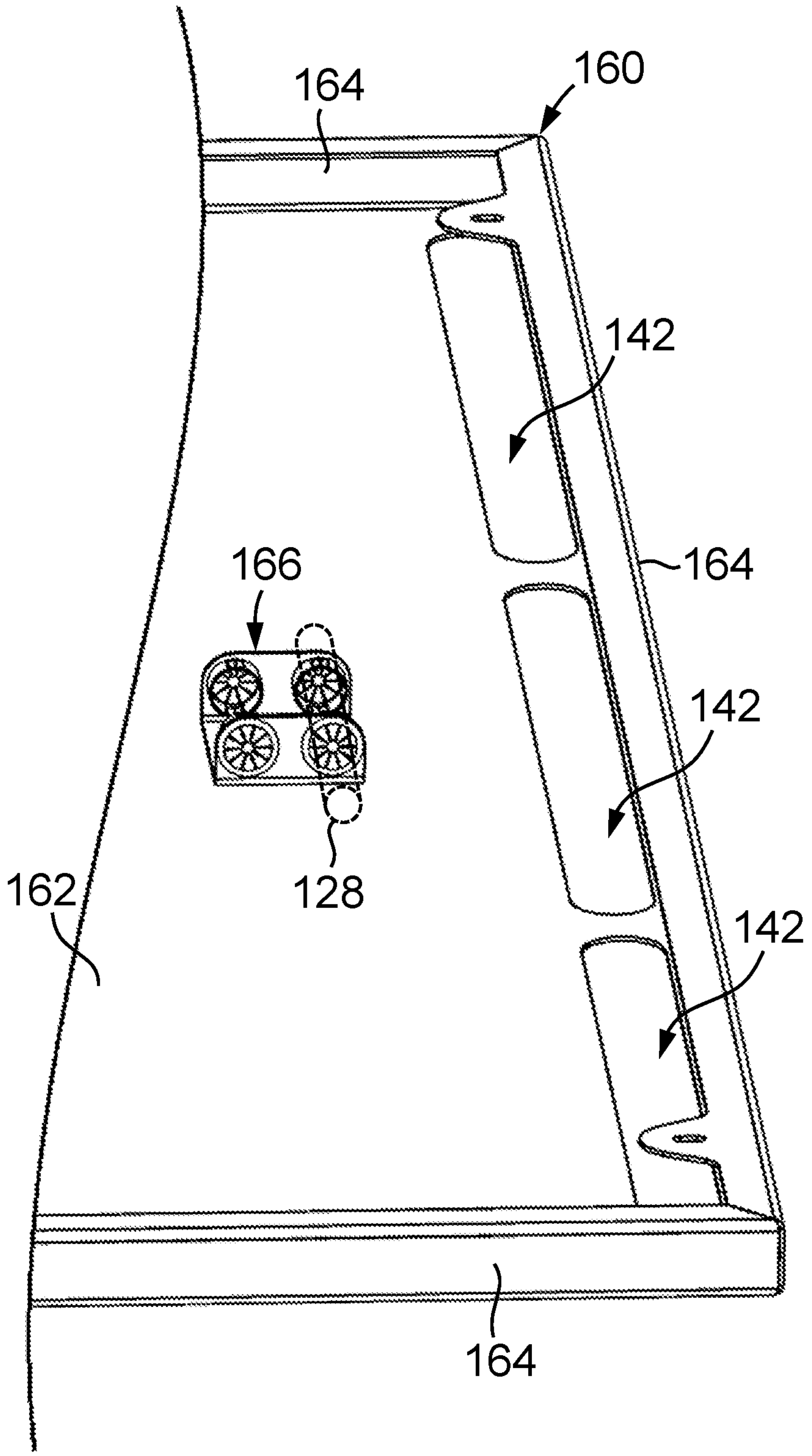
FIG. 10 is a perspective view of a portion of the tray of FIG. 9 according to some embodiments disclosed herein.

As shown in FIGS. 8-10, the temperature sensor 128 may be secured to the tray 160 via a bracket 166. Specifically, the bracket 166 is mounted to the base 162 within the suction manifold 140 so that the airflow 50 is flowed over and/or around the temperature sensor 128 within the suction manifold 140, after flowing into the plurality of inlets 142. As previously described, the airflow 50 may be at a highest average temperature within the suction manifold 140 after flowing through the chamber 12 (and engaging with the products stored therein). As a result, placing the temperature sensor 128 in the suction manifold 140 via being mounted to the tray 160 via bracket 166, the temperature sensor 128 may provide a "worst-case" measurement for the temperature of the airflow 50 so that the controller 40 (FIG. 4) may control operation of the refrigeration module 100 more conservatively to ensure a desired temperature in the chamber 12 during operations.

In addition, mounting the temperature sensor 128 to the base 162 of the tray 160 may simplify the process for inspection, calibration, maintenance, installation, or removal (collectively referred to as "maintenance activities") of the temperature sensor 128. Specifically, as best shown in FIGS. 9 and 10, the tray 160 may be slid out from the front opening 13 of chamber 12 so as to expose at least a portion of the base 162. Because the bracket 166 and temperature sensor 128 is placed proximate the plurality of inlets 142 along the base 162, even partial withdrawal of the tray 160 from the front opening 13 of chamber 12 as shown in FIG. 9 may fully expose the bracket 166 and temperature sensor 128 outside of the chamber 12 for maintenance activities, such as removing frost from the duct.

Figure 11:
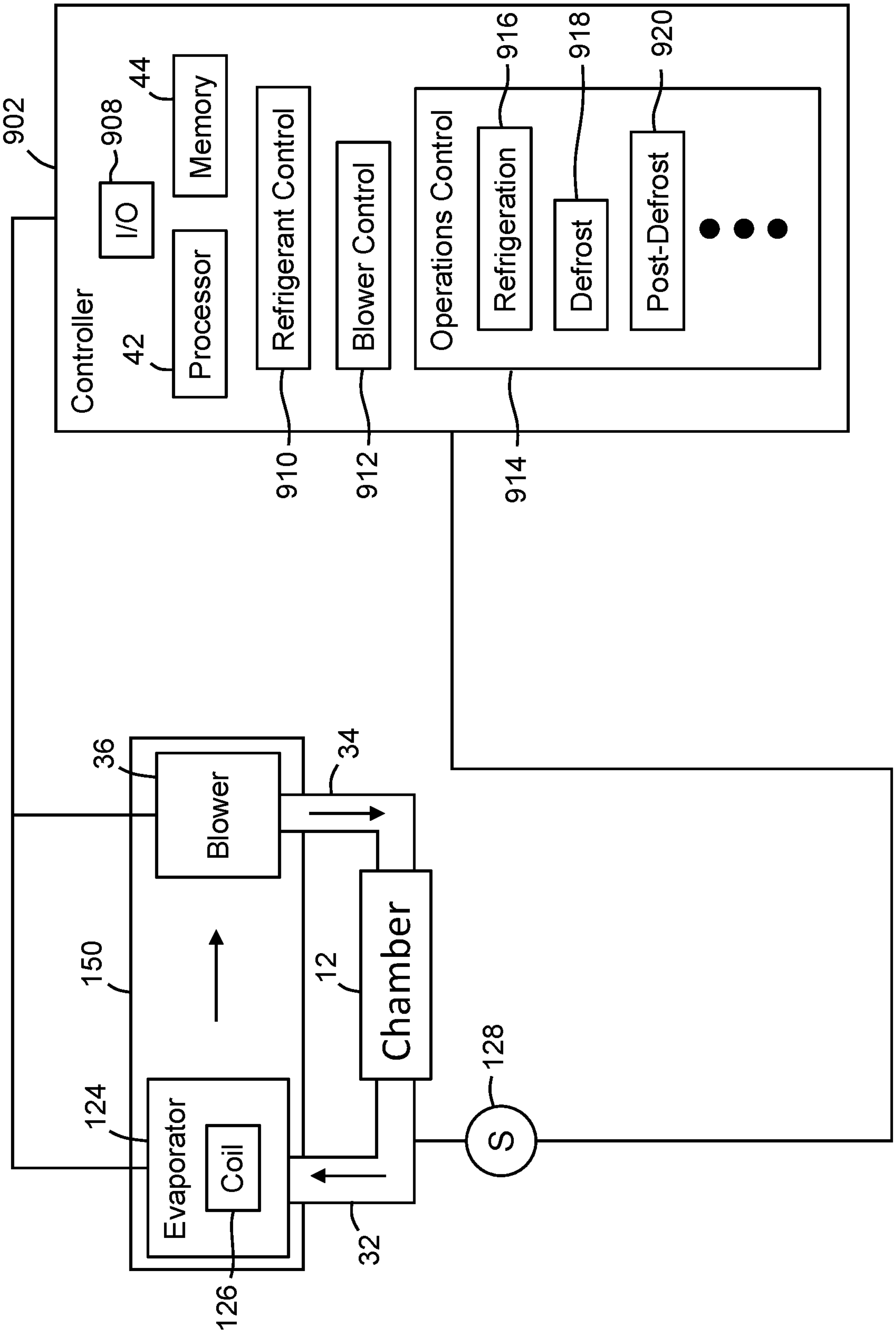
FIG. 11 illustrates an embodiment of a portion of a cold storage system, more specifically a forced air refrigeration system, featuring fan control in refrigeration, defrost, and post-defrost operations.
Figure 13:
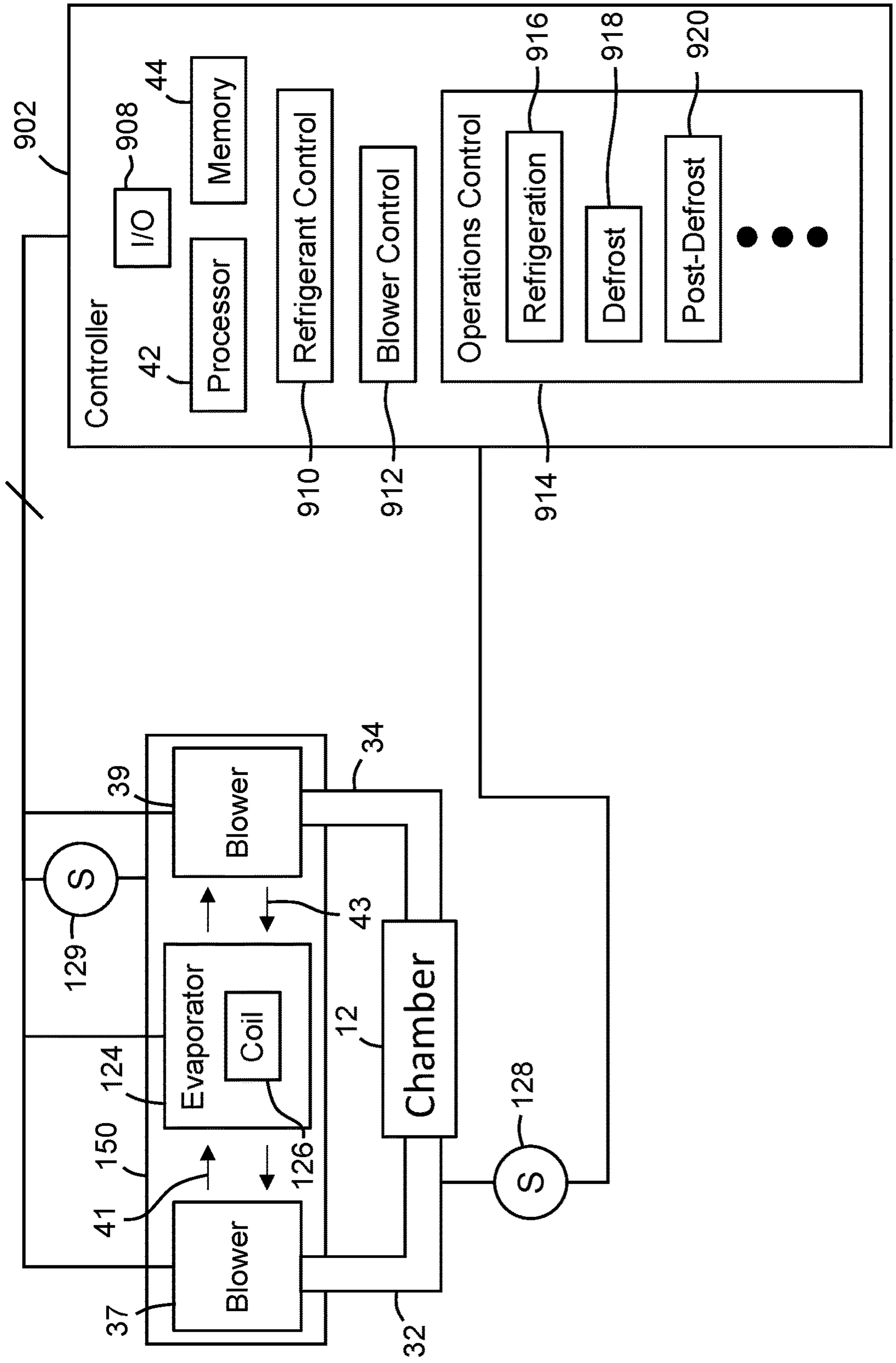
FIG. 13 illustrates an embodiment of a refrigeration module that includes a pair of blowers.

FIG. 11 illustrates an embodiment of a portion of the cold storage system 10 of FIG. 4, which may be a forced air refrigeration system as previously described, featuring fan control in refrigeration, defrost, and post-defrost operations. The system as depicted is capable of multiple operations involving the evaporator 124 with the evaporator coil 126, and the blower 36, including a refrigeration operation, a defrost operation, and a post-defrost operation, and may include further operations as appropriate to the cold storage system 10. It should be appreciated that further components may be omitted for clarity, as may be seen with reference to FIGS. 1-10. It should be further appreciated that FIGS. 11 and 13 depict the controller 902 in a coupled relationship with various components, which may include such further components in various implementations of "coupled to", in various embodiments.

In this embodiment, the controller 902, which may be controller 40 in some embodiments, is depicted as having a processor 42, memory 44 as previously described. In addition, the controller 902 may include various modules which may be implemented in software executing on a processor, firmware, hardware, or combinations thereof, including an I/O module 908, a refrigerant control module 910, a blower control module 912, and an operations control module 914. For instance, in some embodiments, the various modules (e.g., modules 908, 910, 912, 914, etc.) may be at least partially embodied or included in the machine-readable instructions 46 stored on memory 44 as previously described. It is understood that features from the various modules may be combined, or further distributed, etc., in various further embodiments, and that a controller may be implemented with a singular controller, a dual controller, multiprocessor, distributed control, etc. in various embodiments. Here, the refrigerant control module 910 is generally shown to be operably coupled to the evaporator 124 in that the refrigeration control module 910 may control one or more components of the refrigeration module 100 (FIG. 4) to direct cold refrigerant through the evaporator 124 for a refrigeration operation or post-defrost operation, warm refrigerant through the evaporator 124 for a defrost operation, and otherwise control and interact with the evaporator 124. For example, the controller 902 and refrigerant control module 910 may be coupled (e.g., communicatively coupled) to valves 122, 127 and/or compressor 120 of the refrigerant circuit 121 (see FIG. 4 with controller 40). Through such coupling, the controller 902 (via the refrigerant control module 910) may make adjustments to the compressor 120 and valves 122, 127 in the refrigerant circuit 121, to control a flow of refrigerant through the evaporator 124 as generally described herein. Further, the controller 902 may be coupled to the evaporator 124, blower 36 and/or chamber 12 through the sensor 128, which may provide feedback for use in the controller 902 controlling the blower 36. Relatedly, the blower control module 912 is coupled to the blower 36, e.g., communicatively and operably coupled, and may control the blower 36 to, as previously described, move air from the evaporator 124 through the enclosure 150 and through the discharge duct 34 to the chamber 12, and from the chamber 12 back through the suction duct 32, to the evaporator 124, in a recirculating loop, for refrigeration during a refrigeration operation as directed by the refrigeration operation module 916. The blower control module 912 may have further functions as further described below, such as for example turning the blower 36 off during a defrost operation, as directed by the defrost operation module 918, and operating the blower 36 during a post-defrost operation 920, as directed by the post-defrost module 920 (see FIGS. 12A-13B). The I/O module 908 may handle controller port configurations, communications protocols, etc., so that the controller can communicate with other components, including coupling with the evaporator 124, e.g., via compressor 120 and/or valves, coupling with blower 36 and/or sensor 128 as above, e.g., via bus, network, wired or wireless communication.

As previously described, during a defrost operation, the coil 126 may be warmed (e.g., via a hot gas bypass and/or heating elements as previously described), and the blower 36 may be deactivated so as to restrict the flow of air through the enclosure 150 and into or out of the chamber 12. The defrost operation may include introduction of additional heat sources within the enclosure, such as a drain pan heater. As a result, the defrost operation may result in a volume of relatively warm air that surrounds the coil 126, and reinitiating refrigeration operations following the defrost operation may cause the volume of relatively warm air surrounding the coil 126 to be circulated into the chamber 12, which may be undesirable as previously described. Accordingly, various embodiments disclosed herein control air flow from the evaporator 124, to the cold space chamber, to control introduction to the cold space chamber of warm air resulting from the defrost operation. More specifically, some embodiments may perform a post-defrost operation, which involves selectively activating and deactivating the blower 36 over a period of time while restarting a flow of cold refrigerant through the coil 126 so as to meter the flow of warmer air from around the coil 126 to the chamber 12, while the coil works to re-cool the surrounding air, and thereby minimize the transfer of residual heat from the defrost operation to the chamber 12. As described in more detail below, the number and duration of the time intervals during which the blower 36 is activated during the post-defrost operation may be pre-determined, for open-loop operation, or may be variable and determined through sensor feedback, for example from temperature sensor 128 and controller operation, in various embodiments.

Figure 12A:
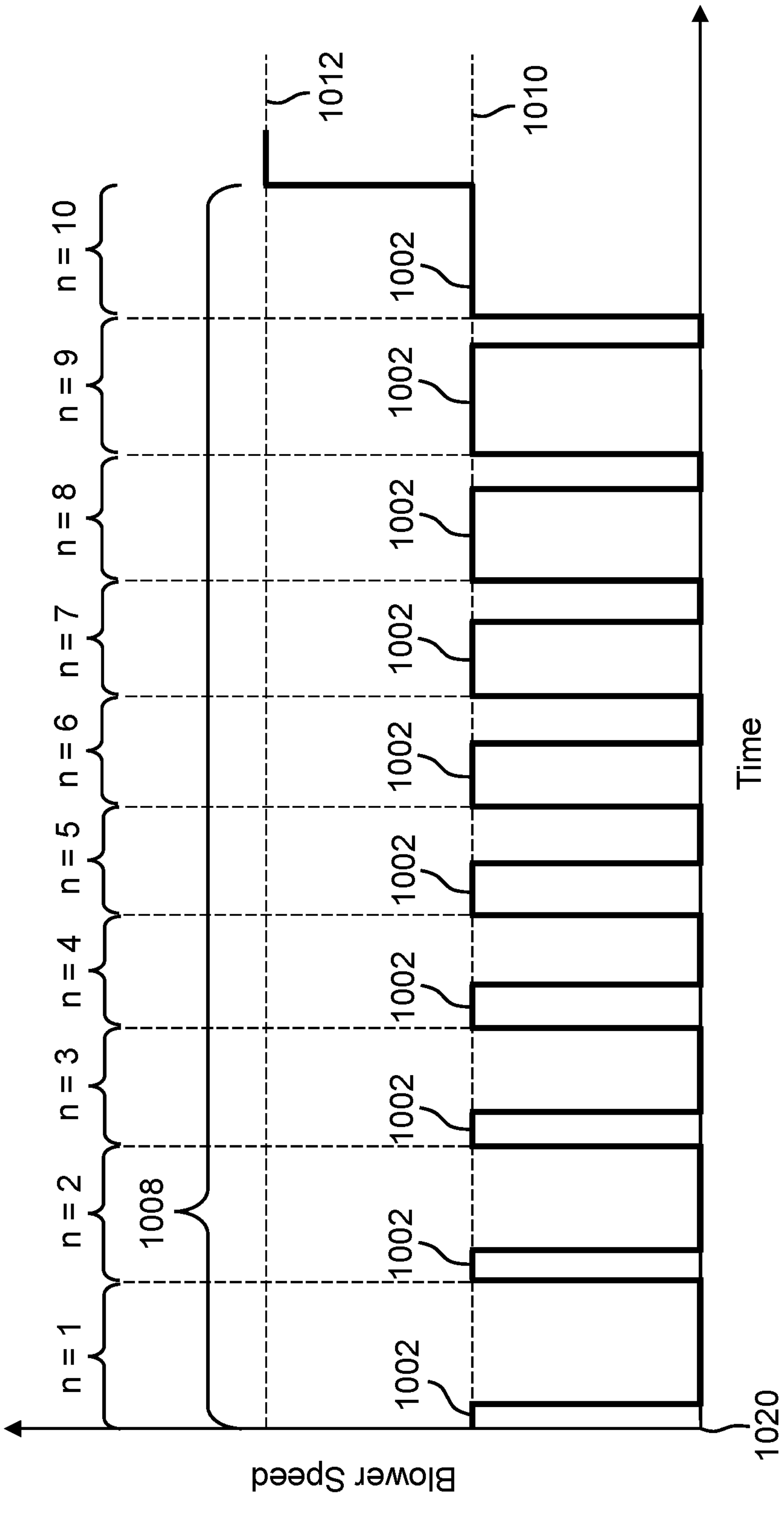
FIG. 12A illustrates an embodiment of defrost fan control, applicable to embodiments of cold storage systems and forced air refrigeration systems.

FIG. 12A illustrates a fan control during a post-defrost operation according to some embodiments. More specifically, FIG. 12A is a graph showing the operating speed of the blower 36 during the post-defrost operation according to some embodiments.

The graph of FIG. 12A shows the operating speed of blower 36 along the Y-axis versus time along the X-axis, and begins at an origin point 1020 where a defrost coil recharge ends, which may be termed the end of a defrost operation. For example, as previously described, warm refrigerant may have been cycled through the evaporator coil 126 during a defrost operation, followed by cycling cooler refrigerant through the evaporator coil 126 for a defrost coil recharge at the end of the defrost operation. In some embodiments, time zero is when the evaporator coil has cooled to a specified temperature. This temperature may vary depending on the chamber operating point. In one embodiment, a temperature that is 10° C. colder than chamber set point is used as such a specified temperature. This may vary in further embodiments. After the origin point 1020, and during the post-defrost operation, the blower 36 may be operated by the controller 40 (FIG. 11), to turn on and off (or activate and deactivate) in a series of pulses 1002 etc. In the specific example depicted in FIG. 12A, there are a total of ten (10) pulses 1002 for the blower 36 depicted during the post-defrost operation. Each pulse 1002 may correspond with a period of time where the blower 36 is operating to advance air from the enclosure 150 to the chamber 12 via the discharge duct 34 and then back from the chamber 12 to the enclosure 150 via the suction duct 32 as previously described. Between sequential pulses 1002 (e.g., such as between the pulse 1002 corresponding to n=1 and the pulse corresponding to n=2 in FIG. 12A), the blower 36 may be deactivated (or turned off) so airflow between the enclosure 150 and chamber 12 is prevented (or at least restricted and/or greatly reduced).

The total period of time covered by a pulse 1002 and a next sequential pause before the start of the next pulse 1002 may be referred to herein as a "period." For instance, in the example depicted in FIG. 12A, there are a total of ten (10) periods numbered n=1, 2, 3, . . . 10. Thus, the first period corresponding to n=1 may include the first pulse 1002, followed by the period of time when the blower 36 is deactivated before the start of the next pulse 1002. Likewise, the second period corresponding to n=2 may include the second pulse 1002 followed by the period of time when the blower 36 is deactivated before the start of the next pulse 1002. The periods n=1, 2, 3, . . . 10 of the post-defrost operation may all have the same duration or may have different durations according to some embodiments.

For example, the series of pulses 1002 may each have a duration less than about ½-2 minutes, such as in a range of about 1-3 seconds minimum to about 1 minute maximum in some embodiments. For example, the entire fan pulsing time may be 5 minutes, 10 minutes or less in some embodiments. In some embodiments the "warm" air in the enclosure gets to about −30° C. or approaching a 50° C. delta from a chamber set point (e.g., −80° C.). It may be advisable to keep tight tolerances during defrost. In some embodiments the warm air is in a range of 10 to 15° C. above chamber temperature maximum.

When the post-defrost operation is completed, e.g., at the end of the total fan pulsing time 1008, the blower 36 may be operated continuously at a desired rate (e.g., the higher speed 1012 described in more detail below) during a refrigeration operation whereby a substantially continuous airflow is established between the enclosure 150 and the chamber 12 to cool the chamber 12 (and its contents) as previously described.

The duration of pulses 1002 for sequential periods n=1, 2, 3, . . . may be the same or may be different during the post-defrost operation. For instance, in the example depicted in FIG. 12A, the pulses 1002 generally increase in duration as time progresses from the origin point 1020 (that is as one moves sequentially from period n=1, to period n=2, to period n=3, and so on), which may be consistent with a theory of operation that a smaller amount of air should be progressed toward the chamber 12 early on in the post-defrost cycle when the temperature of air surrounding the coil 126 may be at a maximum following the end of the defrost operation. The duration of the pulses 1002 may sometimes be referred to herein as a "pulse width." Conversely, as the post-defrost operation continues, the temperature of the air around the evaporator 124 may progressively decrease due to the reestablished cold refrigerant flow through the evaporator coil 126 so that larger and larger amounts of air can be safely progressed toward the chamber 12 without transferring excessive amounts of heat to the chamber 12. Likewise, the duration of time between each successive pulse 1002 for successive periods n=1, 2, 3, . . . etc. may progressively decrease for substantially the same reasons. Thus, as may be appreciated from the graph of the example post-defrost operation depicted in FIG. 12A, each pulse 1002 may occupy a larger and larger percentage of the corresponding period (e.g., n=1, 2, 3, . . . ) during the post-defrost operation. As a result, the overall average flow rate per unit time of air through the blower 36 may be progressively increased via the series of pulses 1002 during the post-defrost operation. Thus, earlier in the post-defrost operation (that is in the left-hand portion of the graph shown in FIG. 12A), when the air surrounding the coil 126 is substantially high, relatively smaller amounts/volumes of air are progressed from the evaporator 124 to the chamber 12 via pulses 1002 that are relatively short in duration and having relatively long pauses therebetween. However, later on in the post-defrost operation, as the air surrounding the coil 126 is cooled via circulation of the cold refrigerant therethrough, the pulses 1002 are operated for longer durations and with relatively shorter pauses therebetween so as to advance greater and greater amounts/volumes of cooler air from the evaporator 124 and into the chamber 12. Experimentation or simulation may be used to guide or develop the various time intervals and/or the total fan pulsing time 1008 of the post-defrost operation, for various embodiments.

In some embodiments, blower 36 speed may also be controlled during the post-defrost operation. Specifically, as depicted in the graph of FIG. 12A the speed 1010 of the blower 36 during each pulse 1002 during the total fan pulsing time 1008 of the post-defrost operation may be less than a speed 1012 of the blower 36 after the post-defrost operation and during a refrigeration operation. That is, relative to each other, the fan is operated at a lower speed 1010 during post-defrost operation (that is, during the series of pulses 1002), and at a higher speed 1012 in refrigeration operation. In some embodiments, the lower speed 1010 may be in a range of 50% of the higher speed 1012. In some embodiments, the lower speed 1010 may be in a range of 10%-90% of the higher speed 1012.

In some embodiments, the speed of the blower 36 during each pulse 1002 of the post-defrost operation may be the same (e.g., the lower speed 1010 previously described). Alternatively, in some embodiments, the speed of the blower 36 may be different for at least some of the pulses 1002. For instance, in some embodiments, the speed of the blower 36 during each pulse 1002 may be progressively increased so that the blower 36 may be operated at a first speed during a first pulse 1002 (e.g., during the first period corresponding to n=1), and then may be operated at a second speed during a second pulse 1002 (e.g., during the second period corresponding to n=2) that occurs sequentially after the first pulse 1002. The progressive increase in the speed of the blower 36 through the sequential pulses 1002 of the post-defrost operation may have the effect of progressively stepping up the speed of the blower 36 via the pulses 1002 to the higher speed 1012 associated with the refrigeration operations. Without being limited to this or any other theory, because the air surrounding the coil 126 may progressively decease in temperature during the post-defrost operation as a result of the cold refrigerant flowing therethrough, the relatively slower speeds of the blower 36 during the pulses 1002 of the initial periods (e.g., n=1, 2, 3, . . . ) in the post-defrost operation may reduce a volume of the relatively warm air that is moved from the evaporator 124 and into the chamber 12 during the initial phase of the post-defrost operation.

The following example, for at least some embodiments, describes an algorithm for evaporator fan pulsing with increasing duty cycle control. This may be understood with reference to FIG. 11 and FIG. 12A. Further embodiments, e.g., with variations in such parameters, are readily developed in keeping with the teachings herein.

NP=NUMBER OF PERIODS=(TOTAL PULSING DURATION/PERIOD DURATION) (e.g., total fan pulsing time 1008 in FIG. 12A)

PW=PULSE WIDTH=[(1/NP)×n×period duration], where 'n' is the number of the present pulse EXAMPLE, IF TOTAL PULSING DURATION (e.g., total fan pulsing time 1008) IS SET TO 5 MINUTES, AND THE PERIOD DURATION IS SET TO 30 SECONDS,

THEN, NP=300/30=10 PERIODS

FOR THE FIRST PULSE, n=1, AND PW=(1/10)*1*30=3 seconds (note: there is a minimum on time of 10 seconds to allow for fan start up delay)

FOR THE SECOND PULSE, n=2, AND PW=(1/10)*2*30=6 seconds

For further pulses, T Controlling each

FOR THE NINTH PULSE, n=9, AND PW=(1/10)*9*30=27 seconds

Figure 12B:
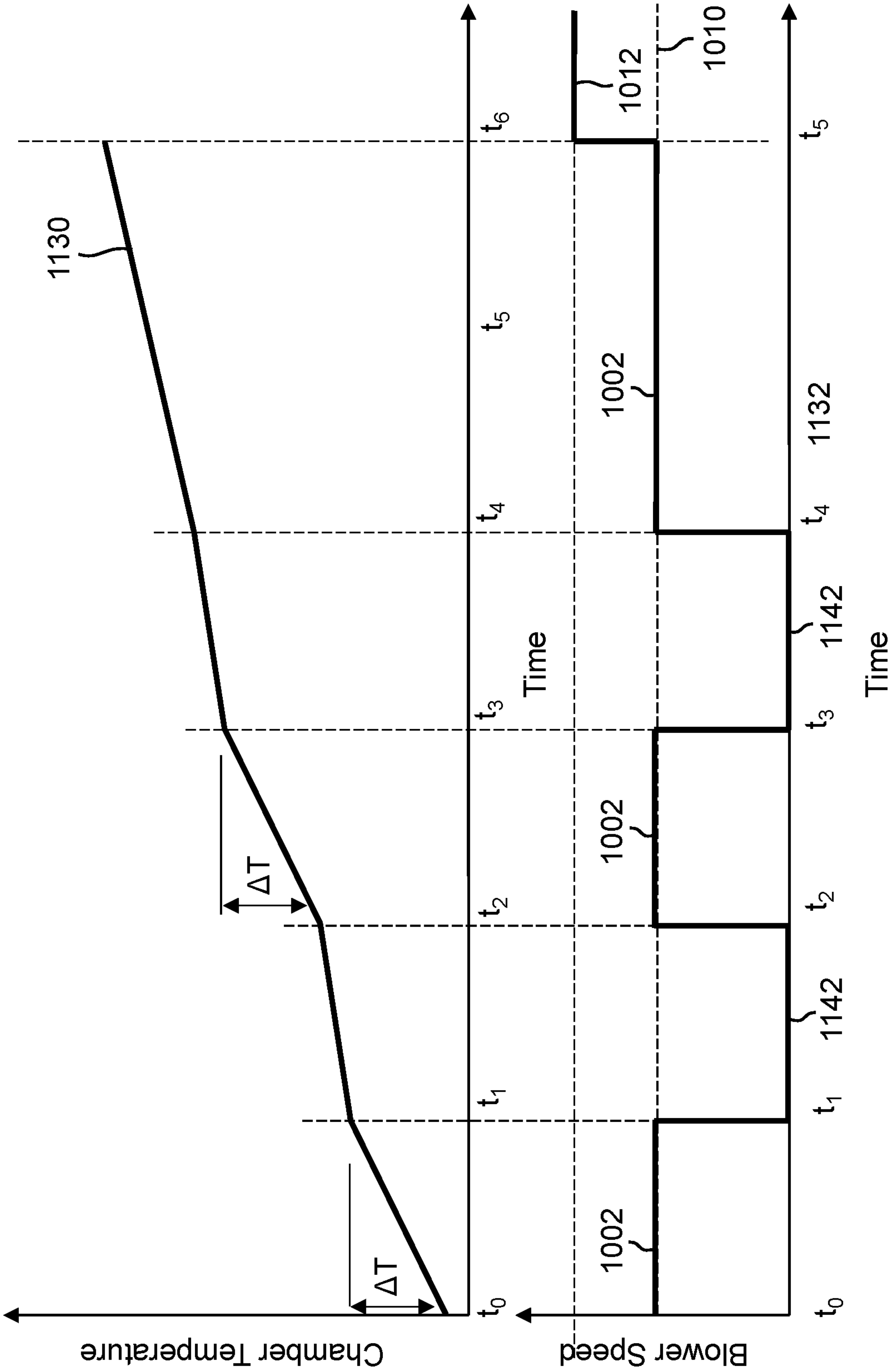
FIG. 12B illustrates a further embodiment of defrost fan control, applicable to embodiments of cold storage systems and forced air refrigeration systems.

AFTER n=NP, (WHEN THE TOTAL PULSING DURATION ENDS) the fan will resume running normally FIG. 12B illustrates a defrost fan control during a post-defrost operation according to some embodiments. More specifically, FIG. 12B is a combined graph showing both the temperature of chamber 12 (e.g., via plot line 1130) and the operating speed of the blower 36 (e.g., via plot line 1132) aligned in time (x-axis) during the post-defrost operation according to some embodiments. Specifically, in some embodiments, a temperature sensor (e.g., temperature sensor 128) may be employed for feedback input to the controller 40, e.g., to the post-defrost module 920 and possibly also the refrigeration module 916 and defrost module 918. Temperature measurements may be used (at least partially) to determine a duration of pulses for the blower 36, for example as implemented through programming the controller 40 and/or hardware. As previously described, the temperature sensor 128 may be positioned in the suction duct 32 so as to provide an average highest measurement of the temperature of airflow 50 flowing through the chamber 12 during operations. However, the temperature sensor 128 may be located in any other suitable location in the chamber 12, ducting 30, enclosure 150, etc., to represent a temperature within the chamber.

During the post-defrost operation, the blower 36 may be operated in a series of pulses 1002 as generally described above for the example of FIG. 12A. However, one or more parameters of the pulses 1002 (e.g., duration, spacing, number of periods, etc.) may be determined based at least in part on the temperature of the chamber 12 (e.g., as determined via temperature sensor 128 and/or other methods). For instance, in some embodiments, each pulse 1002 may have a duration corresponding to a length of time it takes the chamber 12 to increase a threshold number of degrees. Without being limited to this or any other theory (and referring briefly back to FIG. 11), at the initiation of the post-defrost operation, the air surrounding the coil 126 is at an elevated temperature as previously described. Thus, the operation of the blower 36 is configured to move some amount of this warm air from the evaporator 124 into the chamber 12 so that a temperature of the air in the chamber 12 may rise. As a result, during the pulses 1002 of the blower 36 during the post-defrost operation (or for at least some of the pulses 1002), the temperature in the chamber 12 may experience a slight increase in temperature due to the movement of the warmer air from the evaporator 124 as previously described. Thus, in some embodiments, the controller 40 may monitor a temperature of the chamber 12 and limit a duration of each pulse based on a threshold temperature rise in the chamber 12. The threshold temperature rise may be small (e.g., being on the order of a fraction of a degree or less than 5 degrees either Celsius or Fahrenheit in some embodiments), so that a temperature in the chamber 12 may be precisely controlled during the post-defrost operation. In some embodiments, the post-defrost operation (that is, the pulses 1002) may continue until the threshold temperature rise is not seen during a last pulse (or, the threshold temperature rise is not seen after a max pulse time has expired during a last performed pulse). The failure to achieve the threshold temperature rise may indicate that the air temperature surrounding the evaporator 124 has fallen and a sufficient amount of the residual heat from the previous defrost operation has been dissipated so that normal refrigeration operations (including continuous operation of the blower 36 at higher relative speeds) may resume without undesirably increasing a temperature of the chamber 12, and in fact decreasing the temperature of the chamber again back toward a desired setpoint.

Referring specifically to the example in FIG. 12B, the graph of blower operating speed 1132 and chamber temperature 1130 versus time begins at an initial time $t_0$ where a defrost coil recharge ends, which may be termed the end of a defrost operation. For example, during a defrost operation, the coil may have refrigerant at a defrost temperature therein, and at the end of the defrost operation, the coil is recharged with refrigerant at a refrigeration temperature, which may be termed defrost coil recharge. At the initial time $t_0$, the chamber temperature is determined (e.g., via temperature sensor 128 as previously described), and the blower 36 is activated to operate at the reduced speed 1010 during an initial pulse 1002. During the initial pulse 1002 (e.g., from time $t_0$ to time $t_1$) the controller 40 continues to monitor temperature while the fan is operating during the pulse 1002, and when temperature has increased by the threshold temperature rise ΔT. In the graph of FIG. 12B, the chamber temperature may have achieved the threshold temperature rise ΔT at time $t_1$. At this time (e.g., time $t_1$), the controller 40 may deactivate the blower 36 for a fan pause time 1142 that extends from time $t_1$ to time $t_2$. At time $t_2$ (that is, at the end of the initial fan pause time 1142), the controller 40 once again determines the chamber temperature, and activates the blower 36 for a second pulse 1002. As with the initial pulse 1002 from time $t_0$ to time $t_1$, during the second pulse 1002 starting at time $t_2$, the controller 40 monitors the chamber temperature (e.g., via the temperature sensor 128) and once again deactivates the blower 36 when the threshold temperature rise ΔT is achieved at time $t_3$. Thereafter, the controller 40 may initiate a second fan pause time 1142 from time $t_3$ to time $t_4$.

This cycle (fan pulse 1002 followed by fan pause time 1142) may be repeated, with the duration of each pulse 1002 being limited to that necessary for the chamber temperature to rise by the threshold temperature rise ΔT. However, as previously described, during the post-defrost operation, the cool refrigerant circulating through the coil 126 of evaporator 124 may steadily cool the air surrounding coil 126 (FIG. 11) so that each successive pulse 1002 may require longer durations to increase the chamber temperature by the threshold temperature rise ΔT. Eventually, a pulse 1002 may not result in the chamber temperature increasing by the threshold temperature rise ΔT after a maximum pulse time.

Specifically, as shown in FIG. 12B, a third pulse 1002 of the blower 36 may be initiated at time $t_4$. During the pulse 1002, beginning at time $t_4$, the controller 40 may once again monitor the chamber temperature (e.g., via temperature sensor 128); however, at this point the air surrounding the coil 126 of evaporator 124 (FIG. 11) may have fallen sufficiently such that the increase in the chamber temperature during the pulse 1002 starting at time $t_4$ may be greatly reduced. As a result, when a maximum pulse time (e.g., the time period extending from time $t_4$ to time $t_5$ in FIG. 12B) has accrued, if the chamber temperature has not risen by the threshold temperature rise ΔT, the controller 40 may determine that the post-defrost operation has been completed, and may therefore then initial normal refrigeration operations. As previously described, normal refrigeration operations may include operating the blower substantially continuously (at least when refrigeration module 100 is operating) at a higher blower speed 1012. Thus, the plot 1132 in FIG. 12B shows an increase in blower speed at time $t_5$. Operating at the higher blower speed 1012 may have the effect of reducing the chamber temperature back toward a desired set point. As the chamber temperature re-approaches the desired setpoint, the blower may again reduce its operating speed to maintain the chamber temperature substantially at the setpoint.

In some embodiments, the number of pulses 1002 may be based on a total amount of time allotted for the post-defrost operation. Thus, in some embodiments, while the duration of each pulse 1002 may be based on the threshold temperature rise ΔT as previously described, pulses 1002 and pauses 1142 may continue to be performed successively even after pulses 1002 have stopped achieving the threshold temperature rise ΔT.

As previously described for the example of FIG. 12A, during the post-defrost operation of FIG. 12B, the pulses 1002 may each comprise operation of the blower 36 at the same speed (e.g., the lower speed 1010) or at different speeds (e.g., such as progressively increasing speeds). In addition, in some embodiments, the speed of the blower 36 during each pulse 1002 may be at least partially dependent on the chamber temperature (e.g., as determined via the temperature sensor 128). For instance, as temperature of the warm air in the enclosure 150 generally decreases, an operating speed of the blower 36 during a successive pulse 1002 may be increased. In some embodiments, the controller 40 may vary fan speed during a particular pulse 1002. For example, the controller 40 may ramp the blower speed up or down as time progresses during a particular pulse 1002.

Likewise, the duration of each of the fan pause times 1142 may be the same or different during the post-defrost operation. For instance, the fan pause times 1142 may be a predetermined, set time applied by the controller 40, or the fan pause times 1142 may be different, but are prescribed or pre-set by the controller 40. In some embodiments, the duration of each fan pause time 1142 may be variable based on one or more parameters, such as for instance, the chamber temperature, the duration of the previous pulse 1002, etc. Thus, in some embodiments, the fan pause time 1142 could be fixed and predetermined, based on experimentation or simulation, or could be varied according to temperature determination and delta temperature consideration (e.g., change in temperature, shape of temperature curve, temperature flattening out, temperature dropping, temperature rising slowly, etc.).

Without being limited to this or any other theory, varying the blower speed (e.g., during a pulse 1002 or from pulse 1002 to pulse 1002) and/or the duration of the fan pause times 1142 may allow more precise control over movement of air towards or into the cold space chamber.

Timetables, temperature tables, conditional logic, suitable fixed (e.g., predetermined) and variable parameters, evaluation thereof, open-loop, closed-loop, real-time operating system, and other programming techniques are readily employed for implementing embodiments with the controller 40 when performing a post-defrost operation as described herein.

Location of temperature sensor 128, or use of multiple temperature sensors and placements thereof, may be developed through experimentation or simulation. For example, surrounding air temperature may have different properties is applied as a control input to the blower. A temperature sensor measuring direct warming of surrounding air may show progressive decrease and be different than what is shown in FIG. 12B.

It may be determined, through experimentation with a physical apparatus or simulation of same, which fan speeds (e.g., constant, varied with two levels, varied with multiple levels, ramped up, stopped and started, forward and reversed, etc.) provide acceptable control of warmer air from a defrost operation, relative to the goal of minimizing or finding acceptable introduction to the cold space chamber. It may be determined, through such experimentation or simulation, whether the use of a sensor, e.g., temperature sensor 128, and placement of the sensor(s), along with feedback from temperature measurement, further optimize the system relative to such goals. It should be appreciated that embodiments and examples described herein provide such technological solutions, and principles described herein provide ability to vary and derive further embodiments in keeping with the teachings herein.

The following example, for at least some embodiments, describes a control algorithm of evaporator fan pulsing using a chamber temperature. This may be understood with reference to FIG. 11 and FIG. 12B. Further embodiments, e.g., with variations in parameters, are readily developed in keeping with the teachings herein.

TEMPERATURE BASED DESCRIPTION:

WHEN THE DEFROST COIL RECHARGE ENDS, A READING IS TAKEN OF THE CHAMBER TEMPERATURE.

THIS BECOMES THE BASE TEMPERATURE OF THE ALGORITHM. THE CONTROL MONITORS THE CHAMBER TEMP

AND WHEN THE CHAMBER TEMP HAS RISEN THE PROGRAMMED AMOUNT ABOVE THE BASE TEMP (e.g., the threshold temperature rise ΔT), THE FAN WILL SHUT OFF THE FAN WILL REMAIN OFF FOR A PROGRAMMED AMOUNT OF TIME (e.g., a fan pause time 1142).

WHEN THAT TIME IS DONE, THE CONTROLLER WILL TAKE A NEW CHAMBER TEMP READING AND ESTABLISH THAT AS THE NEW BASE TEMP.

THE FAN WILL AGAIN TURN ON AND REMAIN ON UNTIL THE CHAMBER TEMP HAS RISEN THE PROGRAMMED AMOUNT ABOVE THE BASE TEMP AGAIN.

AT THAT POINT THE FAN WILL TURN OFF AGAIN AND WAIT FOR THE PROGRAMMED AMOUNT OF TIME.

THIS CYCLE WILL REPEAT UNTIL THE PROGRAMMED TOTAL PULSING TIME IS REACHED, AT WHICH POINT THE FAN WILL RESUME NORMAL SPEED AND OPERATION

Some embodiments may use reverse of the direction of airflow relative to the evaporator during the post-defrost operation so as to move air across the coil 126 to encourage more rapid cooling, while generally preventing the air surrounding the coil 126 from progressing into the chamber during operations. This may require very short bursts to keep air substantially within the enclosure 150. Alternatively, reversibility may be in the form of equalized mixing by dumping warm air into the back of the chamber, then dumping warm air into the front and the chamber and so on. Various embodiments may use a reversible blower, or multiple blowers. For instance, reference is now made to FIG. 13 which shows an embodiment of refrigeration module 100 that includes a pair of blowers 37 and 39 in place of the blower 36. The blowers 37, 39 include a first blower 37 and a second blower 39 that are positioned in the enclosure 150 with the evaporator 124 (although, other locations of the blowers 37, 39 are contemplated herein). The first blower 37 may be positioned upstream of the evaporator 124 and the second blower 39 may be positioned downstream of the evaporator 124 relative to the normal direction of the airflow during refrigeration operations. Thus, the first blower 37 may be positioned between the evaporator 124 and the suction duct 32, and the second blower 39 may be positioned between the evaporator 124 and the discharge duct 34. During operations, the first blower 37 may be configured to generate an airflow that progresses in a first direction 41 from the evaporator toward the first blower 37, and the second blower 39 may be configured to generate an airflow that progresses in a second direction 43 from the evaporator 124 to the second blower 39. Thus, the first direction 41 and the second direction 43 may be opposite one another.

During a post-defrost operation using the example of FIG. 13, the controller 40 may activate the blowers 37, 39 in an alternating fashion so that air is flowed across the evaporator 124 in the first direction 41 and second direction 43 alternately. Thus, each blower 37, 39 may be operated in a series of pulses that are interleaved in time between one another so that air within the enclosure 150 is moved between the blowers 37, 39 and across the evaporator 124 so that the air may be reduced in temperature via convective contact with the coil 124 (which is circulating cold refrigerant as previously described). During these operations, the timing of the pulses of the blowers 37, 39 may be configured to prevent or at least restrict the progression of air from the enclosure 150 into the chamber 12. In this fashion the residual warm air surrounding the coil 126 at the end of the defrost operation may be prevented (or restricted) from progressing into the chamber 12 until the residual heat is dissipated via the cold refrigerant flowing through the coil 126 during the post-defrost operation. In some embodiments, the interleaved pulsing of the blowers 37, 39 resulting in the reversing directions of the air (e.g., in the direction 41, 43) may continue until a desired temperature has been achieved in the enclosure 150, ducting 32, 34 or elsewhere. For instance, in some embodiments, an additional temperature sensor 129 may be coupled to the enclosure 150 or some component therein (e.g., evaporator 124, blowers 37, 39, etc.), and the controller 40 may perform the post-defrost operation, with blowers 37, 39 pulsing to reversibly flow the air in the directions 41, 43 until a desired temperature (or temperature change) has been achieved.

In some embodiments, the back-and-forth flow of air in the enclosure 150 (e.g., in the direction 41, 43) may be achieved with a single blower (e.g., blower 36 shown in FIG. 11) that is configured to operate in different directions to provide airflow in opposite directions (e.g., the directions 41, 43). Thus, in these embodiments, the back-and-forth flow of air in the direction 41, 43 may be achieved by repeatedly first operating the single blower in a first pulse in a first direction to provide airflow in the first direction 41 and then operating the single blower in a second pulse in a second direction 43, or vice versa.

With reference to FIGS. 4, 5, 11, 12A, 12B, 13, it should be appreciated that there are various signal types, waveform shapes, operating characteristics and operations that may be applicable in various embodiments and variations in keeping with the teachings herein. For example, a controller 40, 902 may communicate with other components using analog signaling, digital signaling, wireless signaling, etc. For example, pulses 1002 in FIGS. 12A and 12B may be for illustrative purposes and may represent other types of signaling and other shapes of blower speed waveforms. Blower 36, 37, 39 in FIGS. 4, 5, 11, 13 may accelerate or decelerate, may or may not get to a steady speed in a given pulse or in response to signaling, may or may not get to a full stop in response to signaling, etc. Temperature shown in plot line 1130 in FIG. 12B may be for illustrative purposes and may climb or fall in a curve, may temporarily reverse direction, may or may not climb or fall monotonically, etc.

Figure 14A:
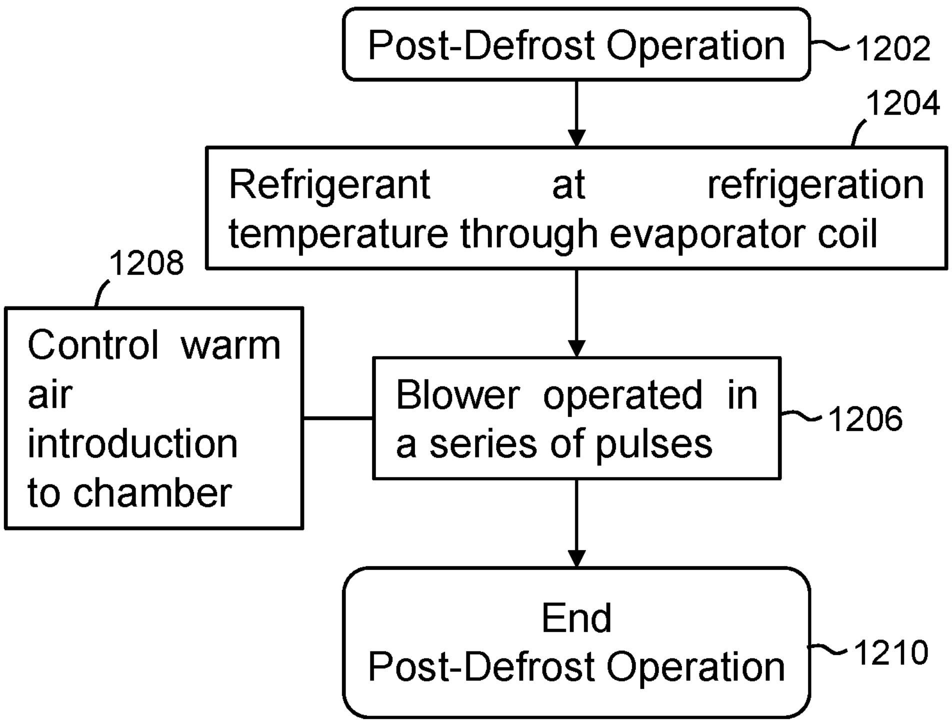
FIG. 14A is a flow diagram illustrating an embodiment of a method of controlling a cold storage system or forced air refrigeration system, featuring an embodiment of defrost fan control.

FIG. 14A is a flow diagram illustrating an embodiment of a method of controlling a refrigeration module of a cold storage system, featuring an embodiment of defrost fan control.

In an action 1202, the system enters a post-defrost operation. For example, the system could have just finished a defrost operation, in which warmer refrigerant was run through the evaporator (e.g., evaporator 124), more specifically through the evaporator coil (e.g., coil 126), which defrosted the evaporator and the evaporator coil but resulted in residual warmer air residing in and around the evaporator. Or, the system could have used warmer air, generated in or routed to the evaporator, to defrost the evaporator and evaporator coil, similarly resulting residual warmer air residing in and around the evaporator.

In an action 1204, the system runs refrigerant at a refrigeration temperature through the evaporator coil. For example, the system is now preparing to resume refrigeration, during the post-defrost operation, after the defrost operation. The refrigeration temperature may be relatively lower than a temperature of the air surrounding the evaporator coil so that heat may tend to transfer from the air surrounding the evaporator coil to the refrigerant flowing in the evaporator coil.

In an action 1206, the blower (e.g., blower 36) is operated in a series of pulses. There may be multiple such pulses with pauses therebetween where the blower is deactivated, there may be fixed or variable time intervals for the series of pulses, there may or may not be temperature sensor feedback used to set, control, or vary the pulses in at least some respect. In some embodiments, actions 1206 may include pulses where a blower generates airflow in a first direction interleaved with pulses where the blower (or a different blower) generates airflow in a second, opposite direction.

In a companion action 1208, the system controls warmer air introduction to the cold space chamber via the series of pulses in action 1206. For example, operation of the blower operating in the plurality of pulses acts to control warmer air (e.g., resulting from the defrost cycle) introduction to the chamber, preferably to minimize, mitigate or optimize such introduction such that the chamber temperature remains as close to a desired setpoint as possible.

In an action 1210, the system ends the post-defrost operation. For example, the system may resume refrigeration, may change fan speed, e.g., increasing fan speed, may further circulate refrigerant at a refrigeration temperature through the evaporator and evaporator coil, may indicate operation status change, etc. The total time duration of the post-defrost operation is defined between the actions 1202 and 1210, and may be predetermined, or variable, achieved through open-loop operation or closed-loop operation and feedback from a temperature sensor, etc., in various embodiments.

Figure 14B:
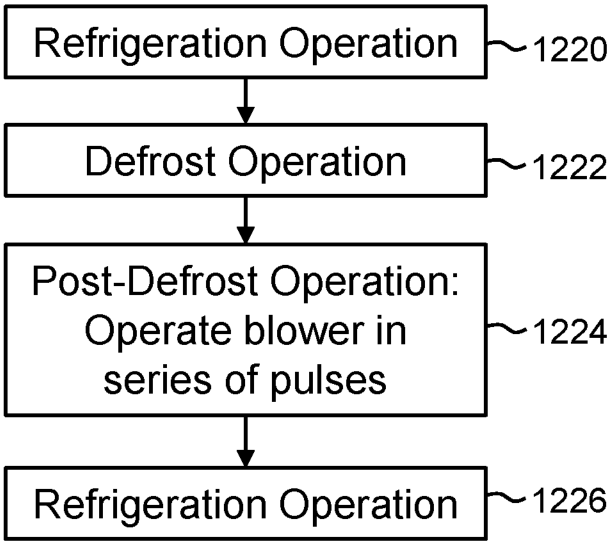
FIG. 14B is a flow diagram illustrating a further embodiment of a method of controlling a cold storage system or forced air refrigeration system, featuring a further embodiment of defrost fan control.

FIG. 14B is a flow diagram illustrating a further embodiment of a method of controlling a refrigeration module of a cold storage system, featuring a further embodiment of defrost fan control.

In an action 1220, the system performs a refrigeration operation. For example, this could be the standard or normal refrigeration for the system, with refrigerant at a refrigeration temperature cycling through the evaporator (e.g., evaporator 124) and evaporator coil (e.g., coil 126), and the blower (e.g., blower 36) recirculating air through the evaporator and chamber (e.g., chamber 12) to achieve and maintain a setpoint temperature within the chamber. During such operation, it is understood frost may or may not be accumulating in the evaporator and on the evaporator coil due to humidity in the air and the temperature of the evaporator coil operating below or often well below the freezing point of water.

In an action 1222, the system performs a defrost operation. For example, the system may cycle warmer refrigerant through the evaporator and evaporator coil, and/or may route warmer air through the evaporator and past the evaporator coil, either such operation acting to defrost the evaporator coil.

In an action 1224, the system performs a post-defrost operation, with the blower being operated in a series of pulses as previously described herein. This may be accompanied by the system cycling refrigerant at a refrigeration temperature through the evaporator and evaporator coil. As previously described, there may be multiple such pulses with pauses therebetween where the blower is deactivated, there may be fixed or variable time intervals for the series of pulses, there may or may not be temperature sensor feedback used to set, control, or vary the pulses in at least some respect. In some embodiments, action 1224 may include pulses where a blower generates airflow in a first direction interleaved with pulses where the blower (or a different blower) generates airflow in a second, opposite direction.

In an action 1226, the system performs a refrigeration operation. For example, this could be the system resuming standard or normal refrigeration for the system, with refrigerant at a refrigeration temperature cycling through the evaporator and evaporator coil, and the blower recirculating air through the evaporator and chamber as previously described.

Figure 14C:
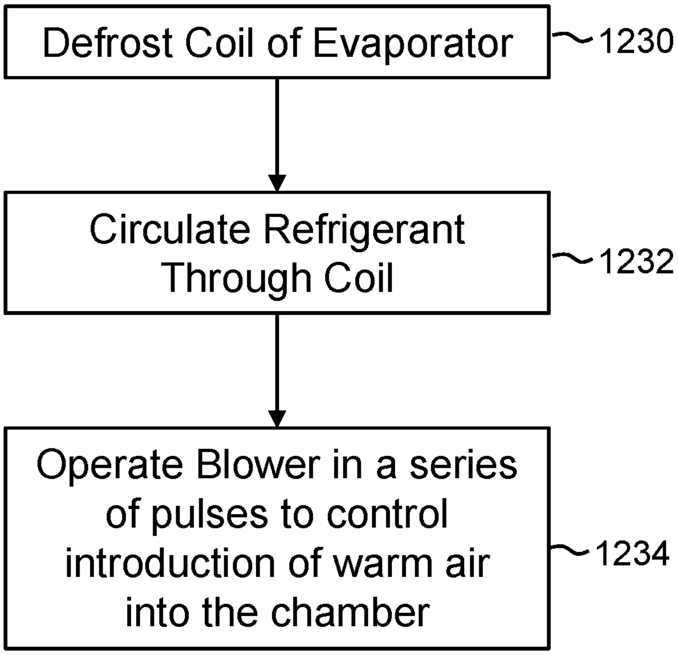
FIG. 14C is a flow diagram illustrating a further embodiment of a method of controlling a cold storage system or forced air refrigeration system, featuring a further embodiment of defrost fan control.

FIG. 14C is a flow diagram illustrating a further embodiment of a method of controlling a refrigeration module of a cold storage system, featuring a further embodiment of defrost fan control.

In an action 1230, the system defrosts a coil of the evaporator. This may form a volume of warm air surrounding the coil as previously described herein.

In an action 1232, the system circulates refrigerant through the evaporator after defrosting in the action 1230, to re-cool the coil and the surrounding air.

In an action 1234, the system operates the blower in a series of pulses to control introduction of warm air (e.g., from the action 1230) into the chamber (e.g., chamber 12). As previously described, there may be multiple such pulses with pauses therebetween where the blower is deactivated, there may be fixed or variable time intervals for the series of pulses, there may or may not be temperature sensor feedback used to set, control, or vary the pulses in at least some respect. In some embodiments, action 1234 may include pulses where a blower generates airflow in a first direction interleaved with pulses where the blower (or a different blower) generates airflow in a second, opposite direction.

The action 1234 may include activating the blower at a first speed during the series of pulses, and this may be followed by operating the blower continuously at a second speed that is greater than the first speed.

The action 1234 may include increasing a time duration for each successive pulse of the series of pulses.

The action 1234 may include activating the blower for a first pulse of the series of pulses, determining a temperature associated with the chamber after activating the blower for the first pulse, and ending the first pulse to deactivate the blower based at least in part on the temperature.

The action 1234 may include determining temperature by use of a temperature sensor mounted in a suction duct defined between the chamber and the evaporator.

The action 1234 may include determining temperature has increased by a threshold amount (e.g., a threshold temperature rise $\Delta T$) during the first pulse, and ending the first pulse based at least in part on the determination.

The action 1234 may include determining that the temperature has not increased above the threshold amount after a threshold period of time during a second pulse of the series of pulses, ceasing the series of pulses based at least in part on the determination.

The above and further embodiments of methods may be practiced by system embodiments, may be practiced using system embodiments, may be implemented in system embodiments and further in tangible, non-transient, computer-readable media.

The following clauses are statements of embodiments as may be applicable in various combinations.

Clause 1. A method of controlling a refrigeration module of a cold space chamber, the refrigeration module having a blower and an evaporator, the method comprising:

(a) defrosting a coil of the evaporator to form a volume of warm air surrounding the coil;

(b) circulating a refrigerant through the evaporator after (a) to cool the coil; and (c) operating the blower in a series of pulses during (b) to control introduction of the volume of warm air to the cold space chamber.

Clause 2. The method of claim 1, wherein (a) comprises operating the refrigeration system to circulate the refrigerant through the coil at an elevated temperature.

Clause 3. The method of claim 1, wherein (c) comprises operating the blower at a first speed during each of the series of pulses, and wherein the method further comprises:

(d) operating the blower continuously at a second speed that is greater than the first speed, after (c).

Clause 4. The method of claim 1, wherein (c) comprises a series of alternating operations that include:

(c1) operating the blower to generate an airflow across the coil in a first direction; and (c2) operating the blower or a further blower to generate an airflow across the coil in a second direction opposing the first direction.

Clause 5. The method of claim 1, wherein the refrigeration module comprises a cascade refrigeration assembly having a first refrigerant circuit and a second refrigerant circuit including the evaporator, and wherein (b) comprises circulating the refrigerant through the second refrigerant circuit including the evaporator.

Clause 6. The method of claim 1, wherein (c) further comprises increasing a time duration for each successive pulse of the series of pulses.

Clause 7. The method of claim 1, wherein (c) further comprises:

(c1) activating the blower for a first pulse of the series of pulses;

(c2) determining a temperature associated with the cold space chamber after (c1); and (c3) ending the first pulse to deactivate the blower based at least in part on the temperature.

Clause 8. The method of claim 7, wherein (c2) further comprises determining the temperature by use of a temperature sensor that is mounted in a suction duct defined between the cold space chamber and the evaporator.

Clause 9. The method of claim 7, wherein (c3) further comprises:

determining that the temperature has increased by a threshold amount during the first pulse; and ending the first pulse based at least in part on the determination.

Clause 10. The method of claim 9, wherein (c) further comprises:

(c4) determining that the temperature has not increased above the threshold amount after a threshold period of time during a subsequent pulse of the series of pulses; and (c5) ceasing the series of pulses based at least in part on (c4).

Clause 11. A cold storage system comprising:

a housing defining a cold space chamber therein;

a refrigeration module configured to cool the cold space chamber, the refrigeration module including an evaporator and a blower configured to generate an airflow from the evaporator to the cold space chamber; and a controller, communicatively coupled to the refrigeration module and configured to:

(a) defrost a coil of the evaporator to form a volume of warm air surrounding the coil;

(b) circulate a refrigerant through the evaporator after (a) to cool the coil; and (c) activate the blower in a series of pulses during (b) to control introduction of the volume of warm air to the cold space chamber.

Clause 12. The cold storage system of claim 11, wherein (a) comprises operate the refrigeration system to circulate the refrigerant through the coil at an elevated temperature.

Clause 13. The cold storage system of claim 11, wherein (c) comprises operate the blower at a first speed during each of the series of pulses, and wherein the controller is further configured to:

(d) operate the blower continuously at a second speed that is greater than the first speed, after (c).

Clause 14. The cold storage system of claim 11, wherein (c) comprises a series of alternating operations that include:

(c1) operate the blower to generate an airflow across the coil in a first direction; and (c2) operate the blower or a further blower to generate an airflow across the coil in a second direction opposing the first direction.

Clause 15. The cold storage system of claim 11, wherein the refrigeration module comprises a cascade refrigeration assembly having a first refrigerant circuit and a second refrigerant circuit including the evaporator, and wherein (b) comprises circulate the refrigerant through the second refrigerant circuit including the evaporator.

Clause 16. The cold storage system of claim 11, wherein (c) further comprises increase a time duration for each successive pulse of the series of pulses.

Clause 17. A tangible, non-transitory, computer-readable media having instructions thereupon which, when executed by a processor, cause the processor to perform a method comprising:

(a) defrosting a coil of an evaporator to form a volume of warm air surrounding the coil;

(b) circulating a refrigerant through the evaporator after (a) to cool the coil; and (c) operating a blower in a series of pulses during (b) to control introduction of the volume of warm air into to a cold space chamber.

Clause 18. The tangible, non-transitory, computer-readable media of claim 17, wherein (c) comprises operating the blower at a first speed during each of the series of pulses, and wherein the method further comprises:

(d) operating the blower continuously at a second speed that is greater than the first speed, after (c).

Clause 19. The tangible, non-transitory, computer-readable media of claim 17, wherein (c) comprises a series of alternating:

(c1) operating the blower to generate an airflow across the coil in a first direction in a first set of the series of pulses; and (c2) operating the blower to generate an airflow across the coil in a second direction opposing the first direction in a second set of the series of pulses.

Clause 20. The tangible, non-transitory, computer-readable media of claim 17, wherein the method further comprises:

(d) adjusting a time duration of each of the series of pulses during (c).

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The recitation of identifiers such as (a), (b), (c) or (1), (2), (3) before steps in a method claim are not intended to and do not specify a particular order to the steps, but rather are used to simplify subsequent reference to such steps.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of controlling a refrigeration module of a cold space chamber, the refrigeration module having a blower and an evaporator, the method comprising:

(a) defrosting a coil of the evaporator to form a volume of warm air surrounding the coil;

(b) circulating a refrigerant through the evaporator after (a) to cool the coil; and (c) operating the blower in a series of pulses during (b) to control introduction of the volume of warm air to the cold space chamber, wherein (c) further comprises:

(c1) activating the blower for a first pulse of the series of pulses;

(c2) determining a temperature associated with the cold space chamber after (c1); and (c3) determining that the temperature has increased by a threshold amount during the first pulse and ending the first pulse to deactivate the blower based at least in part on the determination.

2. The method of claim 1, wherein (a) comprises operating the refrigeration system to circulate the refrigerant through the coil at an elevated temperature.

3. The method of claim 1, wherein (c) comprises operating the blower at a first speed during each of the series of pulses, and wherein the method further comprises:

(d) operating the blower continuously at a second speed that is greater than the first speed, after (c).

4. The method of claim 1, wherein (c) comprises a series of alternating operations that include:

(c1) operating the blower to generate an airflow across the coil in a first direction; and (c2) operating the blower or a further blower to generate an airflow across the coil in a second direction opposing the first direction.

5. The method of claim 1, wherein the refrigeration module comprises a cascade refrigeration assembly having a first refrigerant circuit and a second refrigerant circuit including the evaporator, and wherein (b) comprises circulating the refrigerant through the second refrigerant circuit including the evaporator.

6. The method of claim 1, wherein (c) further comprises increasing a time duration for each successive pulse of the series of pulses.

7. The method of claim 1, wherein (c2) further comprises determining the temperature by use of a temperature sensor that is mounted in a suction duct defined between the cold space chamber and the evaporator.

8. The method of claim 1, wherein (c) further comprises:

(c4) determining that the temperature has not increased above the threshold amount after a threshold period of time during a subsequent pulse of the series of pulses; and (c5) ceasing the series of pulses based at least in part on (c4).

9. A cold storage system comprising:

a housing defining a cold space chamber therein;

a refrigeration module configured to cool the cold space chamber, the refrigeration module including an evaporator and a blower configured to generate an airflow from the evaporator to the cold space chamber; and a controller, communicatively coupled to the refrigeration module and configured to:

(a) defrost a coil of the evaporator to form a volume of warm air surrounding the coil;

(b) circulate a refrigerant through the evaporator after (a) to cool the coil; and (c) activate the blower in a series of pulses during (b) to control introduction of the volume of warm air to the cold space chamber, wherein, the controller is further configured to:

(c1) activate the blower for a first pulse of the series of pulses;

(c2) determine a temperature associated with the cold space chamber after (c1); and (c3) determine that the temperature has increased by a threshold amount during the first pulse and ending the first pulse to deactivate the blower based at least in part on the determination.

10. The cold storage system of claim 9, wherein (a) comprises operate the refrigeration system to circulate the refrigerant through the coil at an elevated temperature.

11. The cold storage system of claim 9, wherein (c) comprises operate the blower at a first speed during each of the series of pulses, and wherein the controller is further configured to:

(d) operate the blower continuously at a second speed that is greater than the first speed, after (c).

12. The cold storage system of claim 9, wherein (c) comprises a series of alternating operations that include:

(c1) operate the blower to generate an airflow across the coil in a first direction; and (c2) operate the blower or a further blower to generate an airflow across the coil in a second direction opposing the first direction.

13. The cold storage system of claim 9, wherein the refrigeration module comprises a cascade refrigeration assembly having a first refrigerant circuit and a second refrigerant circuit including the evaporator, and wherein (b) comprises circulate the refrigerant through the second refrigerant circuit including the evaporator.

14. The cold storage system of claim 9, wherein (c) further comprises increase a time duration for each successive pulse of the series of pulses.

15. A tangible, non-transitory, computer-readable media having instructions thereupon which, when executed by a processor, cause the processor to perform a method comprising:

(a) defrosting a coil of an evaporator to form a volume of warm air surrounding the coil;

(b) circulating a refrigerant through the evaporator after (a) to cool the coil; and (c) operating a blower in a series of pulses during (b) to control introduction of the volume of warm air to a cold space chamber wherein (c) further comprises:

(c1) activating the blower for a first pulse of the series of pulses;

(c2) determining a temperature associated with the cold space chamber after (c1); and (c3) determining that the temperature has increased by a threshold amount during the first pulse and ending the first pulse to deactivate the blower based at least in part on the determination.

16. The tangible, non-transitory, computer-readable media of claim 15, wherein (c) comprises operating the blower at a first speed during each of the series of pulses, and wherein the method further comprises:

(d) operating the blower continuously at a second speed that is greater than the first speed, after (c).

17. The tangible, non-transitory, computer-readable media of claim 15, wherein (c) comprises a series of alternating:

(c1) operating the blower to generate an airflow across the coil in a first direction in a first set of the series of pulses; and (c2) operating the blower to generate an airflow across the coil in a second direction opposing the first direction in a second set of the series of pulses.

18. The tangible, non-transitory, computer-readable media of claim 15, wherein the method further comprises:

(d) adjusting a time duration of each of the series of pulses during (c).

* * * * *